United States Patent
Tawara

(10) Patent No.: US 7,677,978 B2
(45) Date of Patent: Mar. 16, 2010

(54) GAME APPARATUS AND GAME PROGRAM

(75) Inventor: Masaki Tawara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 450 days.

(21) Appl. No.: 11/038,422

(22) Filed: Jan. 21, 2005

(65) Prior Publication Data

US 2005/0159197 A1    Jul. 21, 2005

(30) Foreign Application Priority Data

Jan. 20, 2004    (JP)    ............... 2004-012462

(51) Int. Cl.
*A63F 13/00*    (2006.01)

(52) U.S. Cl. ............... 463/37; 463/7; 463/33; 463/36; 273/317.1; 273/461; 348/141; 345/625; 345/636; 345/655

(58) Field of Classification Search ................ 463/2–8, 463/20, 23, 46–47, 50, 53, 56, 1–5, 7–9, 463/30–34, 36–39, 40–43, 49–57; 375/240.15–240.16, 375/240.25; 348/14.15, 39, 42, 47–52, 115, 348/117, 121, 135–137, 141, 211.14, 576, 348/588–589, 719, 721, E13.004, E13.064–E13.067; 717/168–178; 345/1.1–1.3, 2.1–2.3, 3.1–3.4, 345/24, 419, 467–469, 539, 543–544, 625, 345/636, 638, 653–656, 664–666, 682–683, 345/686, 949–950, FOR. 139, FOR. 153; 434/37–38, 43–44, 69, 118, 240, 256–257; 273/108.1, 108.3, 108.4, 317.1, 317.3, 317.4, 273/317.5, 317.6, 150, 329–330, 406–407, 273/127 R, 148 R, 148 B, 309, 340, 348, 273/361–367, 461; *A63F 13/00*
See application file for complete search history.

(56) References Cited

U.S. PATENT DOCUMENTS 4,275,442 A * 6/1981 Underwood et al. ........... 463/9

(Continued)

FOREIGN PATENT DOCUMENTS

JP    11-202974    7/1999

(Continued)

OTHER PUBLICATIONS

The instruction manual of "Gameboy Advance J.League Winning Eleven Advance 2002", issued by Konami Corp., pp. 10-14, Oct. 10, 2002.

(Continued)

*Primary Examiner*—Peter DungBa Vo
*Assistant Examiner*—Arthur O. Hall
(74) *Attorney, Agent, or Firm*—Nixon & Vanderhye P.C.

(57) ABSTRACT

A game apparatus provided with a touch panel that a player can use to enter an instruction by touching a touch panel with a stick or a finger. A touch panel image, including multiple button switch images, is displayed on the touch panel, and the player can enter a desired instruction by touching a button switch image associated with the desired instruction. Thus, the player is able to provide an instruction concerning the action of a selected character with a simple operation.

26 Claims, 34 Drawing Sheets

U.S. PATENT DOCUMENTS

| | | | |
|---|---|---|---|
| 4,279,421 A * | 7/1981 | Tepoorten et al. ............ 273/237 |
| 5,239,464 A * | 8/1993 | Blair et al. .................. 345/156 |
| 5,847,698 A * | 12/1998 | Reavey et al. ............... 345/173 |
| 5,896,133 A * | 4/1999 | Lynch et al. ................. 715/784 |
| 5,943,043 A * | 8/1999 | Furuhata et al. ............. 345/173 |
| 6,028,593 A * | 2/2000 | Rosenberg et al. .......... 345/156 |
| 6,191,777 B1 * | 2/2001 | Yasuhara et al. ............ 345/173 |
| 6,255,604 B1 * | 7/2001 | Tokioka et al. ........... 178/18.01 |
| 6,266,059 B1 * | 7/2001 | Matthews et al. ........... 715/810 |
| 6,270,413 B1 * | 8/2001 | Aikawa et al. ................ 463/31 |
| 6,364,764 B1 * | 4/2002 | Suzuki .......................... 463/7 |
| 6,375,571 B1 * | 4/2002 | Ohnuma et al. .............. 463/37 |
| 6,428,411 B1 * | 8/2002 | Togami ......................... 463/4 |
| 6,431,982 B2 | 8/2002 | Kobayashi ..................... 463/4 |
| 6,450,886 B1 * | 9/2002 | Oishi et al. .................. 463/36 |
| 6,561,906 B2 * | 5/2003 | Suzuki ........................ 463/31 |
| 6,592,455 B1 | 7/2003 | Okano et al. .................. 463/8 |
| 6,616,703 B1 * | 9/2003 | Nakagawa .................. 715/201 |
| 6,738,049 B2 * | 5/2004 | Kiser et al. .................. 345/173 |
| 6,819,313 B2 * | 11/2004 | Abdelhadi et al. .......... 345/157 |
| 6,881,149 B2 * | 4/2005 | Hasebe et al. ................ 463/43 |
| 6,966,837 B1 * | 11/2005 | Best ............................. 463/33 |
| 7,063,616 B2 * | 6/2006 | Kuri .............................. 463/4 |
| 7,084,859 B1 * | 8/2006 | Pryor ......................... 345/173 |
| 7,137,891 B2 | 11/2006 | Neveu et al. .................. 463/31 |
| 7,160,191 B2 | 1/2007 | Matsumoto .................. 463/31 |
| 7,199,794 B2 * | 4/2007 | Mifune et al. .............. 345/428 |
| 7,254,775 B2 * | 8/2007 | Geaghan et al. ............. 715/701 |
| 7,300,344 B2 | 11/2007 | Fujioka et al. ................. 463/4 |
| 7,451,408 B2 * | 11/2008 | Chan .......................... 715/853 |
| 2001/0003708 A1 * | 6/2001 | Aizu et al. .................... 463/7 |
| 2002/0019257 A1 * | 2/2002 | Koizumi et al. .............. 463/32 |
| 2002/0107060 A1 * | 8/2002 | Ohnuma et al. ................ 463/7 |
| 2002/0119810 A1 * | 8/2002 | Takatsuka et al. .............. 463/7 |
| 2002/0135619 A1 * | 9/2002 | Allport ....................... 345/810 |
| 2002/0160823 A1 | 10/2002 | Watabe et al. .................. 463/7 |
| 2002/0163507 A1 | 11/2002 | Kao ........................... 345/173 |
| 2002/0191029 A1 * | 12/2002 | Gillespie et al. ............ 345/810 |
| 2004/0001048 A1 * | 1/2004 | Kraus et al. ................. 345/173 |
| 2005/0176502 A1 | 8/2005 | Nishimura et al. ............ 463/31 |
| 2006/1000714 * | 1/2006 | Davani et al. ............... 345/161 |

FOREIGN PATENT DOCUMENTS

| | | |
|---|---|---|
| JP | A-2000-163031 | 6/2000 |
| JP | 2001-5438 | 1/2001 |
| JP | A-2001-005438 | 1/2001 |
| JP | 2003-108123 | 4/2003 |

OTHER PUBLICATIONS

The instruction manual of "Nintendo Gamecube Soul Caliber II", issued by Namko Ltd., pp. 47-55, Mar. 27, 2003.

Japanese Official Action issued for Japanese Patent Application No. 2004-012462, dated Feb. 22, 2008.

"Tsukaeru Online Soft Mansai! Palm Series Saikyoka Pack 1000, the first edition," ACSII Corporation, Feb. 25, 2001, third printing of the first edition, pp. 90-92, 115 and 309, ISBN: 4-7561-3579-X, partial English translation.

Japanese Office Action issued for corresponding Japanese Patent Application No. 2004-012463, dated Feb. 22, 2008.

ASCII Corporation, "Tsukaeru Online Soft Mansai! Palm Series Saikyoka Pack 1000, The First Edition," ISBN: 4-7561-3579-X, third printing of the first edition, pp. 90-92, 115 and 309, Feb. 25, 2001.

U.S. Appl. No. 11/038,396, of Masaki Tawara, filed Jan. 21, 2005.

* cited by examiner

FIG. 26

OPERATION SWITCH SECTION — 818

SINGLE OPERATION CONTROL TABLE

| | | |
|---|---|---|
| DURING OFFENSE | CROSS-KEY PAD | DRIBBLE |
| | A | SHORT PASS |
| | B | SHOOT |
| DURING DEFENSE | A | SLIDING |
| | B | CLEAR |

SIMULTANEOUS OPERATION OR SEQUENTIAL OPERATION CONTROL TABLE

| | | |
|---|---|---|
| DURING OFFENSE | A+B | ONE-TWO PASS |
| | R+B | THROUGH-PASS |
| | R+B A | FLY THROUGH-PASS |
| | L+A | NORMAL FEINT |
| | L+B | STEPOVER FEINT |
| | L+A+B | KICK FEINT |
| | AA | FAR CENTERING |
| | BB | NEAR CENTERING |
| DURING DEFENSE | BB | PRESSING |
| | AA | KEEPER RUSH |

GAME APPARATUS AND GAME PROGRAM

FIELD

The illustrative embodiments relate to a game apparatus and a game program, and more particularly to a game apparatus and a game program which allow the player to control actions of game objects by, for example, simultaneously or sequentially depressing button switches or by repeatedly depressing a button switch.

BACKGROUND AND SUMMARY

Conventionally, there have been game apparatus in which actions of game objects are controlled by operating button switches, e.g., by simultaneously or sequentially depressing button switches or by repeatedly depressing a button switch. For example, a soccer game apparatus including button switches, such as A button, B button, L button, R button, a cross key, a start button, a select button, etc., is disclosed by the instruction manual of "GAMEBOY ADVANCE J.LEAGUE Winning Eleven ADVANCE 2002", issued by Konami Corp., Oct. 10, 2002, pp. 10-14 (hereinafter, referred to as "Non-Patent Document 1"). In this game apparatus, as disclosed on pages 10-14 of Non-Patent Document 1, a character that is operated by the player acts in various ways including dribbling, passing, centering, shooting, tackling, sliding, etc. Moreover, there are numerous variations in each type of action. For example, there are various types of passes, e.g., "short pass", "long pass", "through-pass", "fly through-pass", "one-two pass", "fly one-two pass", etc. While the character that is operated by the player acts in various ways, there are only a small number of button switches which can be used to control the action of the game object. Accordingly, this game apparatus is configured such that a number of actions can be selected by simultaneously or sequentially depressing a plurality of button switches or by repeatedly depressing a button switch. For example, a long pass is made by repeatedly depressing the B button, a through-pass is made by simultaneously depressing the A button and the B button, a fly through-pass is made by simultaneously depressing the L button, A button, and B button, a one-two pass is made by simultaneously depressing the L button and B button, and a fly one-two pass is made by repeatedly depressing the B button with L button depressed.

Also, a fighting game apparatus including A button, B button, X button, Y button, a cross key, a control stick, etc., is disclosed by the instruction manual of "NINTENDO GAMECUBE SOUL CALIBER II", issued by Namko Ltd., Mar. 27, 2003, pp. 47-55 (hereinafter, referred to as "Non-Patent Document 2"). In this game apparatus, as disclosed on pages 47-55 of Non-Patent Document 2, a number of characters are configured, and a number of martial art techniques are set for each character. For example, in the case of a character named "Raphael Sorel", in order to use a technique called "Rapid Tack Plus", a control stick (or a cross key) must be pressed to the right and B button repeatedly depressed three times. Also, in order to use a technique called "Serpentine", the A button must be depressed, the control stick (or the cross key) down must be pressed down, and then the A button must be depressed again.

In the game apparatus disclosed by Non-Patent Document 1, in order to control the action of the game object so as to act in various ways, it may be necessary to memorize a significant number of operation patterns of simultaneous and sequential depressing of buttons. Even if it is possible to memorize a large number of operation patterns, it may be difficult to perform various patters of simultaneously or sequentially depressing buttons during actual gameplay.

Accordingly, in the game apparatus disclosed by Non-Patent Document 1, those who can spend a long time enjoying gameplay are better able to perform all the actions, and those who cannot spend a long time (i.e., light users, etc.) may only be able to perform a small number of actions For example, in the soccer game disclosed by Non-Patent Document 1, in the situation where a fly one-two pass is effective, a player who has not mastered how to make such a pass might only be able to make a one-two pass.

Also, in the game apparatus disclosed by Non-Patent Document 2, it is necessary to memorize a number of operation patterns in order to appropriately control the action of the game object in various ways. In particular, those who are not familiar with the game and have memorized only the operation patterns for a few specific techniques are typically only able to use such techniques as they have memorized.

SUMMARY

Needs exist for a game apparatus and a game program which allow even a beginner to appropriately control a game object to act in various ways depending on game situations without memorizing or performing complicated operation patters, such that the player is able to enjoy the real fun of the game. Reference numerals and the like are added between parentheses in the below description, only for the purpose of facilitating the understanding of the below-described illustrative embodiments, rather than limiting the scope of the invention in any way.

One exemplary illustrative game apparatus is provided with a game image display means (11), a touch panel display means (12) provided with a touch panel (16), and a plurality of button switches (15a-15e, 15R, 15L). This exemplary apparatus executes a game which allows a first player to control an action of a first game object (50) and which allows a second player or a computer to control an action of a second game object.

The game apparatus includes: second object action execution means (31, S51); first action execution means (31, S63); second action execution means (31, S62); game progression control means (31, 846, S52-S60); touch panel display control means (31, 849, S14, S15, S19, S24, S26, S27, S28, S56); association means (811); and alternate second action execution means (31, S45).

The second object action execution means executes the action of the second game object regardless of whether the first game object is active. The first action execution means detects whether a button switch (A, B, etc.) is singly operated and executes a first action (short pass, shoot, etc.) of the first game object in accordance with a detection result. The second action execution means detects whether button switches are simultaneously (A+B, R+B, etc.) or sequentially (A→A, B→B, etc.) operated or whether a button switch is repeatedly operated, and executes a second action (one-two pass, through-pass, far-centering, near-centering, etc.) of the first game object that is different from the first action in accordance with a detection result. The game progression control means allows the game to progress in accordance with results of execution of the second object action execution means, the first action execution means, and the second action execution means, and displaying a game situation on the game image display means. The touch panel display control means displays a button switch image including at least one touch panel image (52, 56a, 56b, 57, 58, etc.) on the touch panel display means. The association means associates the second action with the button switch image. The alternate second action execution means executes the second action associated with the button switch image by the association means if the touch panel detects a contact with the button switch image displayed on the touch panel display means.

Note that in a single operation, anyone of the plurality of button switches is depressed once. In a simultaneous operation, at least two of the plurality of button switches are simultaneously depressed. In a sequential operation, any one of the plurality of button switches is depressed, and immediately thereafter the same or another button switch is depressed (within a predetermined time period). Note that the sequential operation may be a combination of three or more consecutive operations on a button switch/button switches.

The number of types of action of the first game object may greater than the number of button switches.

The touch panel display control means may further display on the touch panel display means a touch panel image including a combination of button switch images which varies depending on the game situation.

The touch panel display control means may also display on the touch panel display means a touch panel image including a button switch image (60) which varies depending on an attribute value of the first game object.

Additionally a first one (58) of the button switch images may include a second button switch image (58a) different from the first button switch image, and the association means may associate the first button switch image with a predetermined action (feint), and may associate the second button switch image with an action (stepover feint) which is a subdivision within a category of the predetermined action.

Also the button switch image may include an animated image (75a-75d) which displays a second action (set play) associated with the button switch image.

And, the association means may assign a part of the second action (through-pass, one-two pass, normal feint, stepover feint, kick feint) to a button switch image included in one of the touch panel images, and may assign none of other parts of the second action (fly through-pass).

Further, the game may be a team sport game using a ball (51), and the touch panel display control means may displays on the touch panel display means a touch panel image including a button switch image which varies depending on whether the first game object's team (FIG. 4) or the second game object's team (FIG. 20) possesses the ball.

Additionally, the game may be a team sport game using a ball (51), and the touch panel display control means may display on the touch panel display means a touch panel image including a button switch image which varies depending on an area (centering area, shoot area, etc.) in which the ball lies.

An exemplary illustrative computer-readable storage medium having stored therein a game program may cause a computer of a game apparatus, which is provided with a game image display means (11), a touch panel display means (12) provided with a touch panel (16), and a plurality of button switches (15a-15e, 15R, 15L), to execute a game which allows a first player to control an action of a first game object (50) and which allows a second player or a computer to control an action of a second game object.

The exemplary game program may cause the computer to act as: second object action execution means (31, S51); first action execution means (31, S32); second action execution means (31, S32); game progression control means (31, 849, S14, S15, S19, S24, S26, S27, S28, S56); touch panel display control means (31, 849, S14, S15, S19, S24, S26, S27, S28, S56); association means (811); and alternate second action execution means (31, S45).

The second object action execution means executes the action of the second game object regardless of whether the first game object is active. The first action execution means detects whether a button switch (A, B, etc.) is singly operated and executes a first action (short pass, shoot, etc.) of the first game object in accordance with a detection result. The second action execution means detects whether button switches are simultaneously (A+B, R+B, etc.) or sequentially (A→A, B→B, etc.) operated or whether a button switch is repeatedly operated, and executes a second action (one-two pass, through-pass, far-centering, near-centering, etc.) of the first game object that is different from the first action in accordance with a detection result. The game progression control means allows the game to progress in accordance with results of execution of the second object action execution means, the first action execution means, the second action execution means, and displaying a game situation on the game image display means. The touch panel display control means displays a button switch image including at least one touch panel image (52, 56a, 56b, 57, 58, etc.) on the touch panel display means. The association means associates the second action with the button switch image. The alternate second action execution means executes the second action associated, by the association means, with the button switch image if the touch panel detects a contact with the button switch image displayed on the touch panel display means.

Thus, it may be possible to allow a beginner in the game, or a user who prefers playing an easy-to-play game, to control a game object to act in various ways by using the touch panel without memorizing complicated operation patterns of simultaneous depression, sequential depression, etc. This may make it easier for the beginner or the user to master an operation method, so that the beginner or the user can enjoy the fun of allowing the game to progress while performing appropriate operations depending on game situations.

It may also be possible to select game object actions, the number of which can exceed the number of button switches, resulting in a wider range of actions. Accordingly, it may be possible to allow the game to progress in more diverse ways.

Also, the button switch image displayed on the touch panel may vary in accordance with the game situation, therefore the player is able to select an appropriate action adapted to the situation. Also, by causing the button switch image to vary in accordance with the situation, it is possible to allow the player to select each action from among a wide variety of actions. Moreover, the player is made aware of an appropriate action by the display of the button switch image. This display can act as a guide to, in particular, beginners, showing them what moves would be appropriate in what situations.

The button switch image may further vary in accordance with a character attribute value, making it is possible to implement different actions depending on a character's particular characteristics. Thus, it is possible to cause the game to progress in more diverse ways.

In one illustrative embodiment, a beginner who is unable to perform exact operations can readily select an action by operating a first button switch image which is relatively expansive in area. A skilled game player who is able to accurately operate a second button, which is relatively small in area and incorporated in the first button, can select a more specific and complicated action. Thus, it is possible to make the game fun to both the beginner and the skilled game player.

It may also be made easy for the player to recognize, for each button, which action is implemented by depressing the button.

Further, with or without operating the touch panel, a skilled game player, who is good at simultaneous and sequential depression of button switches, can enjoy the fun of controlling a game object to perform actions other than actions which can be implemented by the touch panel.

A touch panel image including a button switch image, which varies between offense and defense modes, may also be displayed, therefore a button switch image that is required only in defense mode is not displayed in offense mode and vice versa.

Additionally, a touch panel image may include a button switch image which varies depending on the area in which the ball lies. Accordingly, it is not necessary to constantly display a button switch image which is needed only when the ball lies in a predetermined area.

These and other aspects of the illustrative embodiments will become more apparent from the following detailed description of the illustrative embodiments when taken in conjunction with the accompanying drawings.

BRIEF DESCRIPTION OF THE DRAWINGS

FIG. 26 shows an exemplary operation control table 818 associated with an operation switch section 15;

DESCRIPTION OF THE ILLUSTRATIVE EMBODIMENTS

Hereinafter, various exemplary illustrative hand-held game apparatus will be described with reference to the accompanying drawings.

Figure 1:
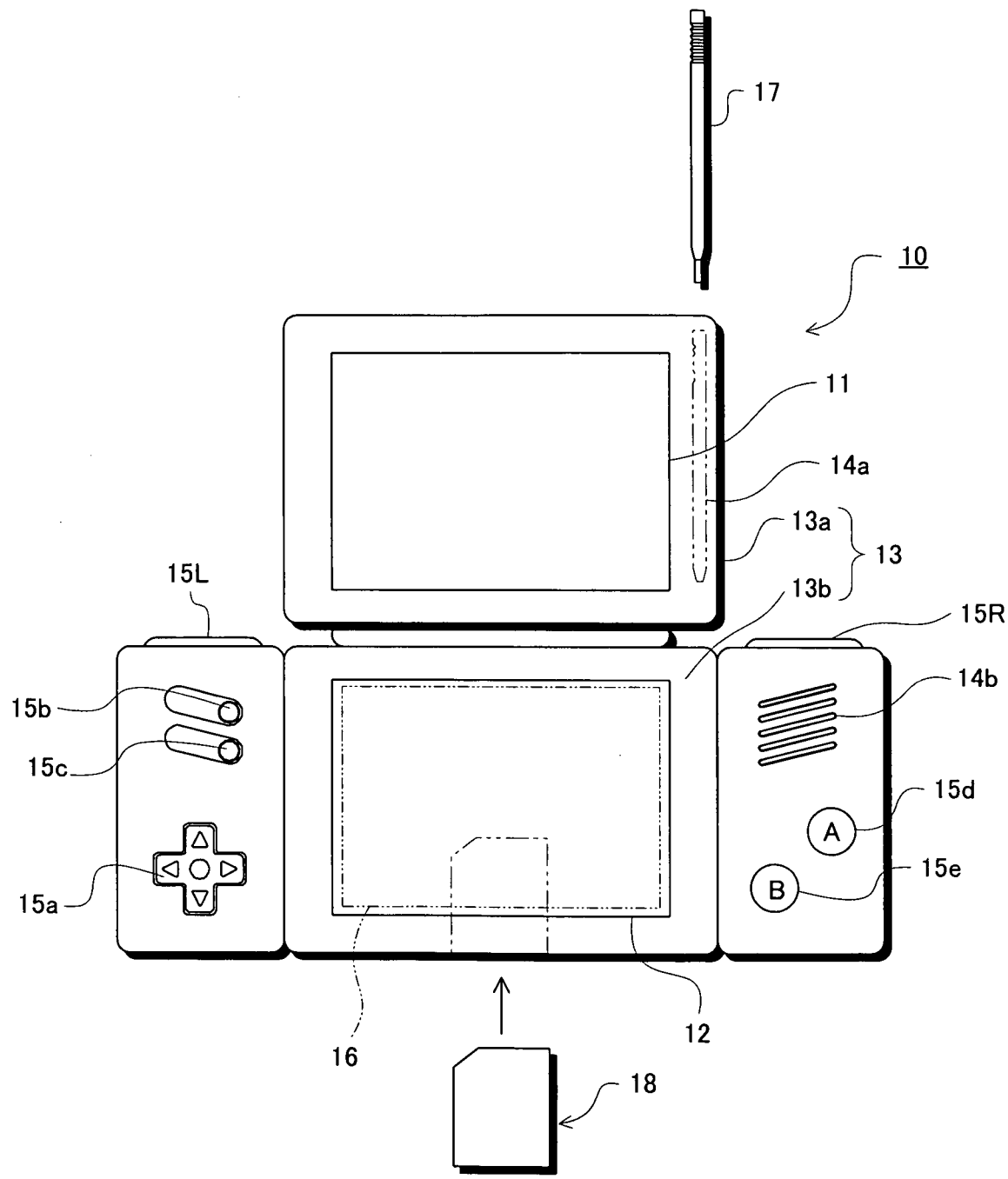
FIG. 1 is an external view of an exemplary hand-held game apparatus according to an illustrative embodiment.

FIG. 1 is an external view of an exemplary hand-held game apparatus according to one illustrative embodiment. In FIG. 1, a hand-held game apparatus 10 is accommodated in a housing 13 so that two liquid crystal display devices (hereinafter, referred to as "LCDs") 11 and 12 are placed in predetermined positions. Specifically, in the case where the first and second LCDs 11 and 12 are to be disposed one on top of the other, the housing 13 is composed of an upper housing 13a and a lower housing 13b, the upper housing 13a being supported by a portion of the upper side of the lower housing 13b so as to be pivotable. The upper housing 13a has a planar contour which is slightly larger than that of the first LCD 11. The upper housing 13a has an opening in one principal face thereof, through which a display screen of the first LCD 11 is exposed. The lower housing 13b has a more elongated planar contour than that of the upper housing 13a so as to have a longer lateral dimension. An opening for exposing the display screen of the second LCD 12 is formed in a portion of the upper housing 13a which lies substantially in the center of the upper housing 13a along the lateral direction. A sound hole 14b is formed in either (right or left) wing of the upper housing 13a between which the second LCD 12 is interposed.

An operation switch section 15 is provided on the right and left wings of the upper housing 13a between which the second LCD 12 is interposed.

The operation switch section 15 includes: a direction switch 15a, a start switch 15b, and a select switch 15c, which are provided on a principal face of the left wing of the lower housing 13b lying to the left of the second LCD 12; operation switches 15d and 15e, which are provided on a principal face of the right wing of the lower housing 13b lying to the right of the second LCD 12; and side switches 15L and 15R, which are provided on an upper face (upper side face) of the lower housing 13b. The direction switch 15a is used by a player for providing instructions concerning directions on the game screen, e.g., instructions of a moving direction in which to move a player object (or a player character) that can be controlled by using the operation switch section 14, or instructions of a moving direction in which to move a cursor, for example. The operation switches 15d and 15e are used for giving instructions such as: "jump", "punch", "use a weapon", etc., in the case of an action game; or "get an item", "select a weapon", "select a command", etc., in the case of a role playing game (RPG) or a simulation RPG. As necessary, more operation switches may be added.

A touch panel 16 is mounted on the upper principal face of the second LCD 12. The touch panel 16 may be of any one of a resistive film type, an optical type (infrared type), and a capacitive coupling type. When a stick 17 (or a finger) is pressed against or moved or dragged on the upper principal face of the touch panel 16, the touch panel 16 detects the coordinate position of the stick 17 and outputs coordinate data.

As necessary, an accommodation hole 14a for accommodating the stick 17 is provided near a side face of the upper housing 13a. A cartridge receptacle (not shown) into which a game cartridge 18 internalizing a memory having a game program stored therein (e.g., a ROM) is detachably inserted is provided in a portion of a side face of the lower housing 13b. A connector (not shown) lies inside the cartridge receptacle for providing electrical connection with the game cartridge 18. Furthermore, the lower housing 13b (or alternatively the upper housing 13a) accommodates an electronic circuit board (30 shown in FIG. 2 which will be described later) on which various electronic components such as a CPU are mounted. Examples of the information storage medium for storing a game program are not limited to a non-volatile semiconductor memory such as a ROM or a flash memory, but may also be a CD-ROM, a DVD, or any other optical disk type storage medium. Note that although the game program is supplied from the game cartridge 18 to the hand-held game apparatus 10, the present invention is not limited to this. The game program may be previously incorporated in the hand-held game apparatus 10, or may be externally provided to the hand-held game apparatus 10 via a communication line.

Figure 2:
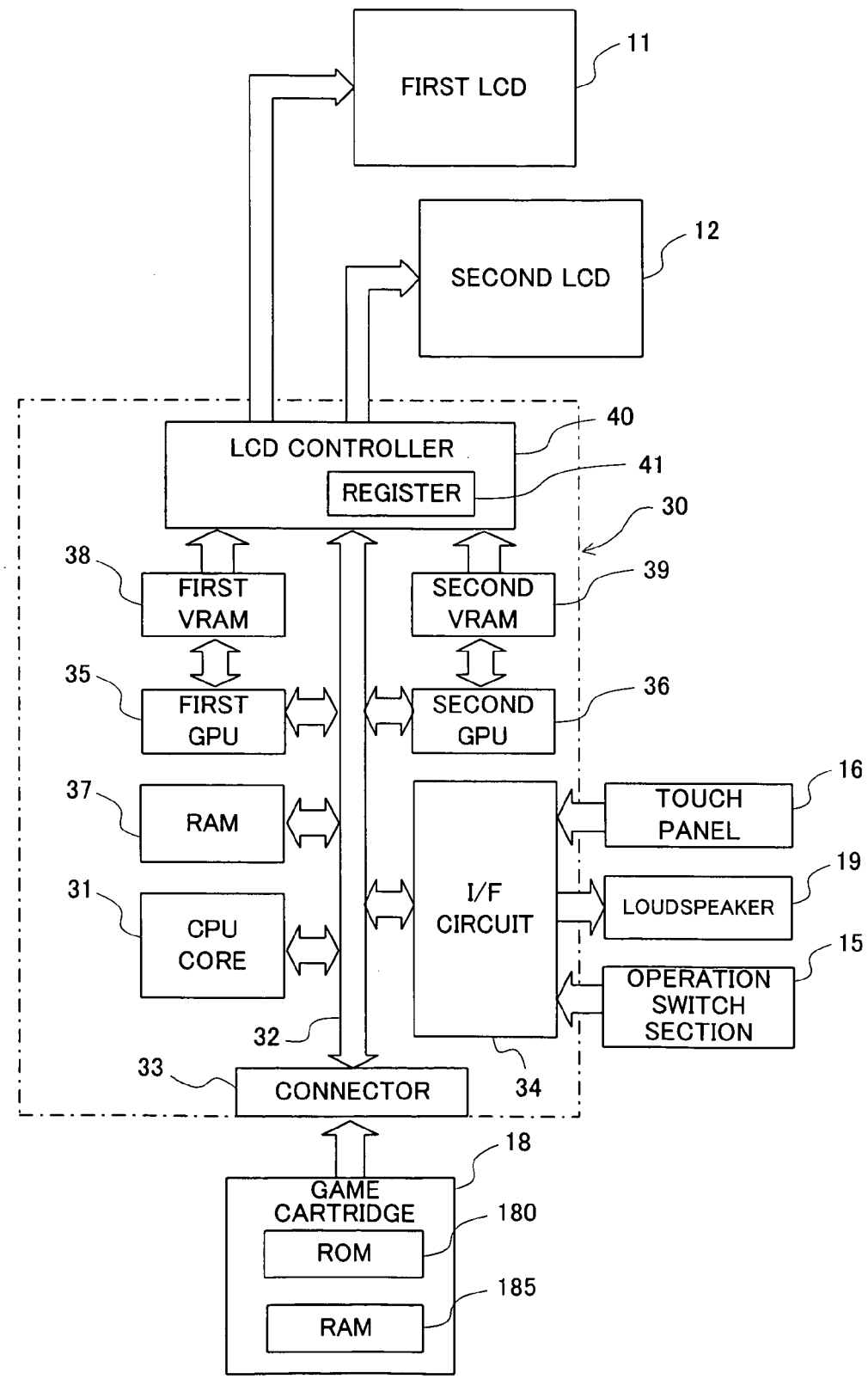
FIG. 2 is a block diagram of the hand-held game apparatus 10.

FIG. 2 is a block diagram of an exemplary hand-held game apparatus 10. In FIG. 2, a CPU core 31 is mounted on the electronic circuit board 30 accommodated in the housing 13. Via a bus 32, the CPU core 31 is connected to a connector 33 for enabling connection with an input/output interface (I/F) circuit 34, a first graphics processing unit (first GPU) 35, a second graphics processing unit (second GPU) 36, a RAM 37, and an LCD controller 40. The game cartridge 18 is detachably connected to the connector 33. The game cartridge 18 is a storage medium for storing a game program. Specifically, the game cartridge 18 includes a ROM 180 for storing a game program and a RAM 185 for storing backup data in a rewritable manner. A game program which is stored in the ROM 180 of the game cartridge 18 is loaded onto a RAM 37, and the game program having been loaded onto the RAM 37 is executed by the CPU core 31. Temporary data which is obtained by the CPU core 31 executing the game program and data from which to generate images are stored in the RAM 37. The operation switch section 15, the touch panel 16, and the loudspeaker 19 are connected to the I/F circuit 34. The loudspeaker 19 is placed inside the sound hole 14b.

The first GPU 35 is connected to a first video-RAM (first VRAM) 38. The second GPU 36 is connected to a second video-RAM (second VRAM) 39. In accordance with an instruction from the CPU core 31, the first GPU 35 generates a first game image on the basis of the data used for image generation which is stored in the RAM 37, and writes (stores) images into the first VRAM 38. In accordance with an instruction from the CPU core 31, the second GPU 36 generates a second game image on the basis of the data used for image generation which is stored in the RAM 37, and writes (stores) images into the second VRAM 39. The first and second VRAMs 38 and 39 are connected to the LCD controller 40.

The LCD controller 40 includes a register 41. The register 41 stores therein a value of 0 or 1 in accordance with an instruction from the CPU core 31. In the case where the value in the register 41 is 0, the LCD controller 40 outputs a game image written in the first VRAM 38 to the first LCD 11, and also outputs a game image written in the second VRAM 39 to the second LCD 12. Also, in the case where the value in the register 41 is 1, the LCD controller 40 outputs a game image written in the first VRAM 38 to the second LCD 12, and also outputs a game image written in the second VRAM 39 to the first LCD 11.

The I/F circuit 34 is a circuit which governs exchanges of data between the CPU core 31 and the external input/output devices such as the operation switch section 15, the touch panel 16, and the loudspeaker 19. The touch panel 16 (including a device driver for the touch panel) has a coordinate system corresponding to the coordinate system of the second VRAM 39, and outputs data of position coordinates corresponding to a position which is input (designated) by means of the stick 17. For example, in the present embodiment, the display screen of the second LCD 12 has a resolution of 256 dots×192 dots, and the touch panel 16 also has a detection accuracy of 256 dots×192 dots so as to correspond to the display screen of the second LCD 12. The detection accuracy of the touch panel 16 may be lower or higher than the resolution of the display screen of the second LCD 12.

Hereinbelow, an exemplary flow of a game process executed by the hand-held game apparatus 10 will be described with reference to specific examples of display images. An exemplary game according to an illustrative embodiment, which is executed by the hand-held game apparatus 10, is a soccer game, though the present invention is not limited to the soccer game.

Figure 3:
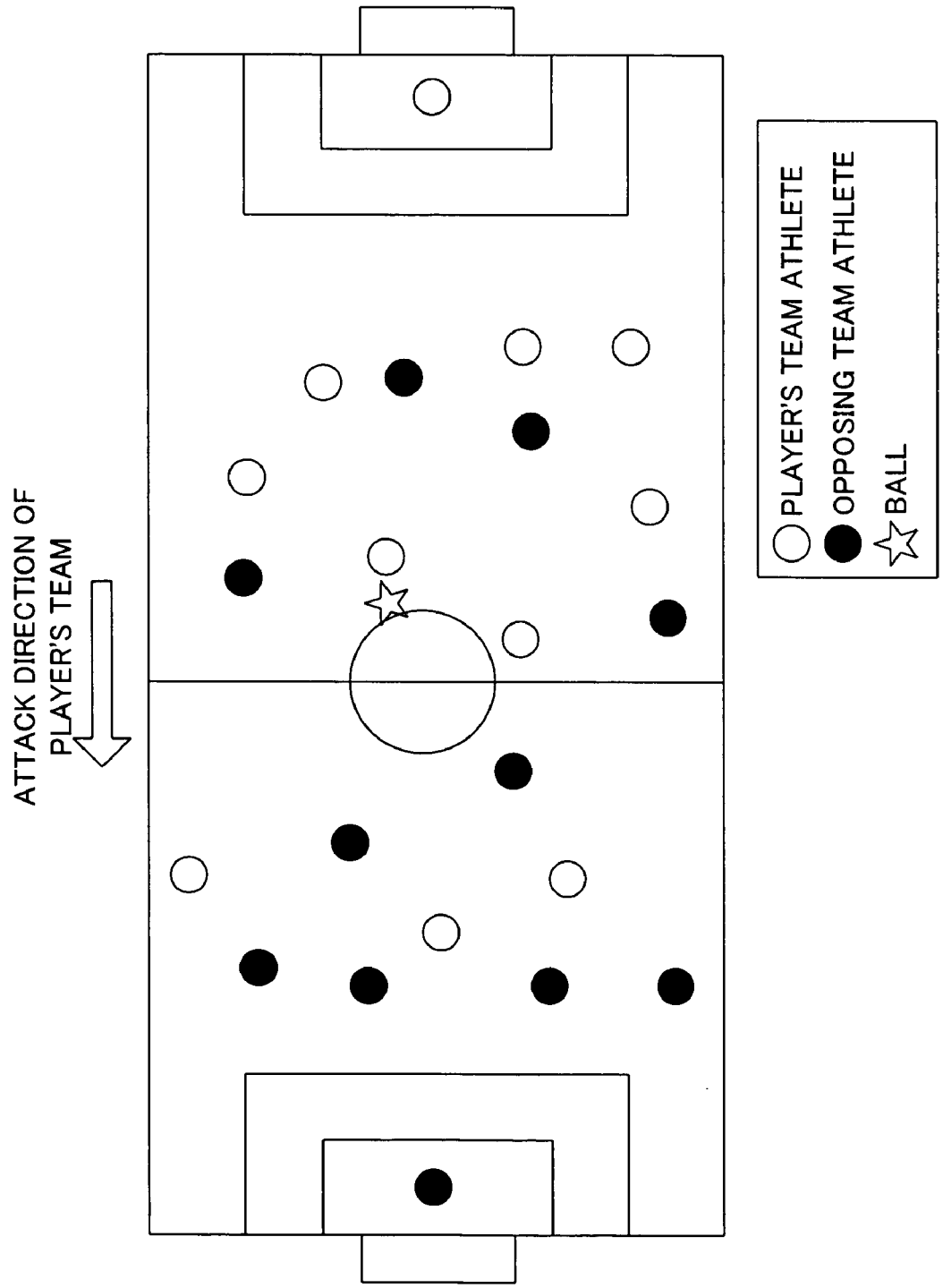
FIG. 3 is a diagram showing a virtual game field of a soccer game.

FIG. 3 is a conceptual diagram showing a virtual game field of a soccer game. In the following descriptions a team for an object operated by the player (hereinafter, referred to as the "player's team") is on offense to the left of the game field shown in FIG. 3. The opposing team is automatically controlled by the computer based on a predetermined algorithm. Note that the opposing team may be operated by another player.

Figure 4:
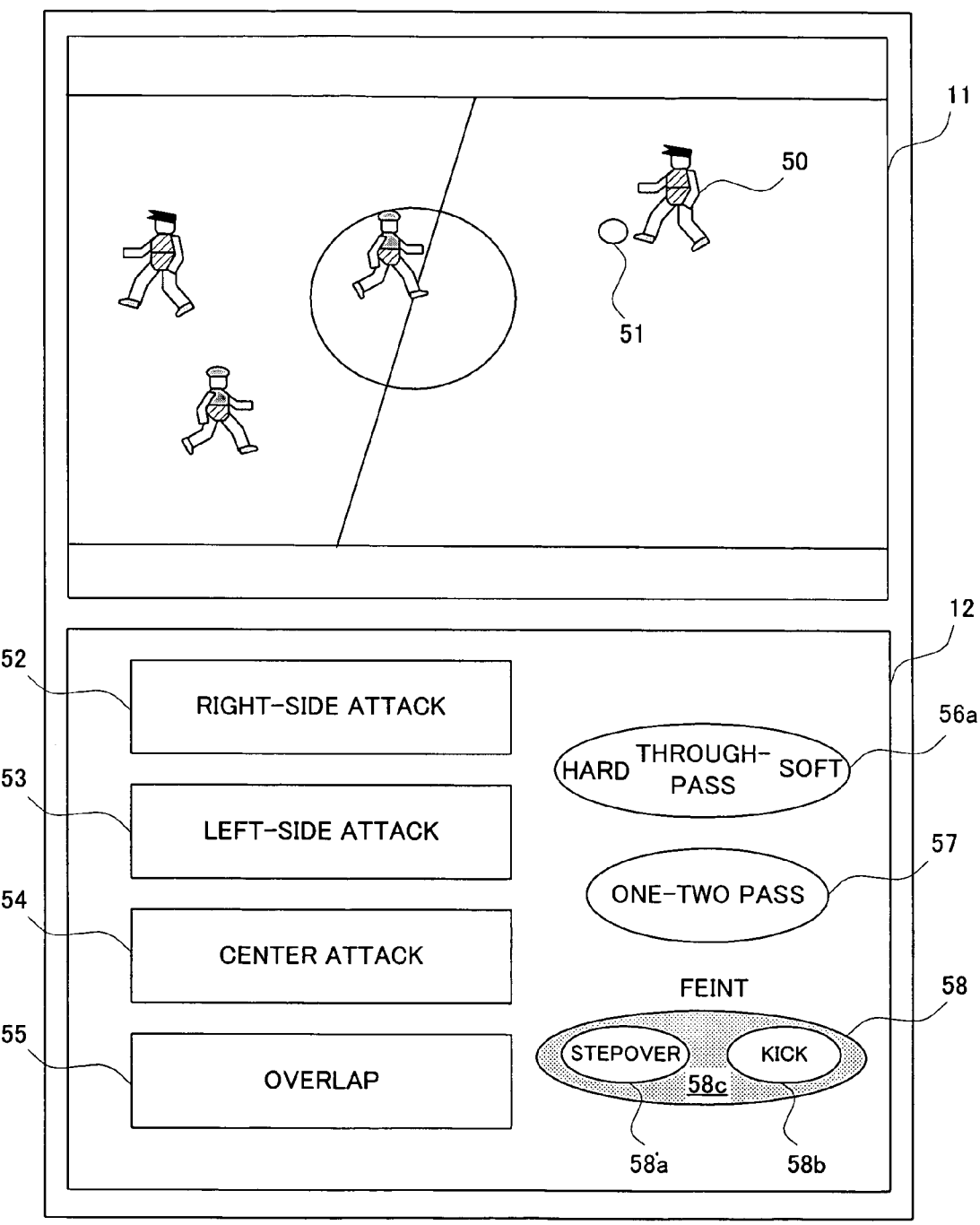
FIG. 4 shows examples of display images on first and second LCDs 11 and 12 which are displayed in the case of a normal offense.

FIG. 4 shows examples of display images on the first and second LCDs 11 and 12 which are displayed in the situation where the player's team keeps the ball (i.e., on offense). The first LCD 11 displays the game field, and the second LCD 12 displays a touch panel image including a plurality of button switch images 52-55, 56a, 57, and 58. The player operates the direction switch 15a (hereinafter, referred to as a "cross key")

to move a character 50 which keeps a ball 51 (i.e., the character dribbles the ball). When the player's team is on offense, the player can operate a character in the team that is in possession of the ball. When the player's team is on defense, the player can operate a character in the team that is the closest to the ball. Hereinbelow, the character that is being operated by the player is referred to as a "selected character", and other characters are referred to as "non-selected characters".

The player operates the operation switch 15*d* (hereinafter, referred to as "A button"), the operation switch 15*e* (hereinafter, referred to as "B button"), the side switch 15L (hereinafter, referred to as "L button"), and the side switch 15R (hereinafter, referred to as "R button") to give instructions concerning the action of a selected character 50 and the strategy of the player's team. For example, if the player depresses the A button, the selected character 50 makes a "short pass". Also, if the player depresses the B button, the selected character 50 makes a "shot". Note that the player is able to enter an instruction different from those which can be entered by operating individual operation switches by simultaneously depressing a plurality of operation switches or repeatedly or sequentially depressing one or more operation switches at short intervals. For example, if the player depresses the A button and B button simultaneously, the selected character 50 makes a "one-two pass (wall pass)". Also, if the R button and B button are depressed simultaneously, the selected character 50 makes a "through-pass". Similarly, a "normal feint" is made by simultaneously depressing the L button and A button, a "stepover feint (in which the selected character steps over the ball)" is made by simultaneously depressing the L button and B button, and a "kick feint (in which the selected character pretends to kick the ball)" is made by simultaneously depressing the L button, A button, and B button. Also, if the A button is repeatedly depressed twice, the selected character 50 makes a "far-centering pass (by which the ball is centered to the far-side)", and if the B button is repeatedly depressed twice, the selected character 50 makes a "near-centering pass (by which the ball is centered to the near-side)".

Also, the player can enter instructions by touching the touch panel 16 with the stick 17 or a finger. As described above, a touch panel image including a plurality of button switch images 52-55, 56*a*, 57, and 58, is displayed on the second LCD 12 provided with the touch panel 16 and the player can enter a desired instruction by touching a button switch image associated with the desired instruction. For example, if the player touches the button switch image 57, the selected character 50 makes a "one-two pass". In this manner, the player can provide an instruction to make a "one-two pass" by a simple operation, compared to an operation of operation switches (simultaneous depression of A button and B button). Also, the button switch image 57 includes letters ("one-two pass") which indicates the action of a character (or may include an illustration which represents the action), and therefore the player can quickly determine which button switch image should be depressed in the current situation by simply taking a look at the touch panel image. Note that in FIG. 4, the rectangular button switch images 52-55 are intended for entering instructions concerning the strategy of the player's team, and the oval button switch images 56*a*, 57, and 58 are intended for entering instructions concerning actions of specific characters (in particular, the selected character 50) of the player's team.

In FIG. 4, the button switch image 58 associated with "feint" is provided with two regions 58*a* and 58*b*, which read respectively "stepover" and "kick". If the player depresses the region 58*a* which reads "stepover", the selected character 50 makes a "stepover feint". Also, if the player depresses the region 58*b* which reads "kick", the selected character 50 makes a "kick feint". Note that if the player depresses a region 58*c,* the selected character 50 makes a "normal feint". As such, the button switch image for making an action (feinting) includes button switch images for making actions in one category (feinting) which is classified into subdivisions (such as a stepover feint or a kick feint). The regions 58*a* and 58*b* are smaller than the region 58*c,* and therefore it is difficult for the player to accurately touch the regions 58*a* and 58*b* during the game. However, it is so configured that the "stepover feint" and the "kick feint" achieve a higher effect of feinting than the effect achieved by the "normal feint", resulting in an increase of the possibility of successfully feinting past players of the opposing team. Accordingly, the player tends to attempt to touch the regions 58*a* or 58*b.*

The button switch image 58 can be said to consist of a button switch image ("feint") which incorporates two other button switch images ("stepover" and "kick"). In this manner, the touch panel image includes a plurality of button switch images related to each other, which are displayed in a hierarchical manner (as in a contour map), leading to easy viewing of the screen image compared to the case where the button switch images are separately provided, so that easy entering of instructions is facilitated.

Figure 5:
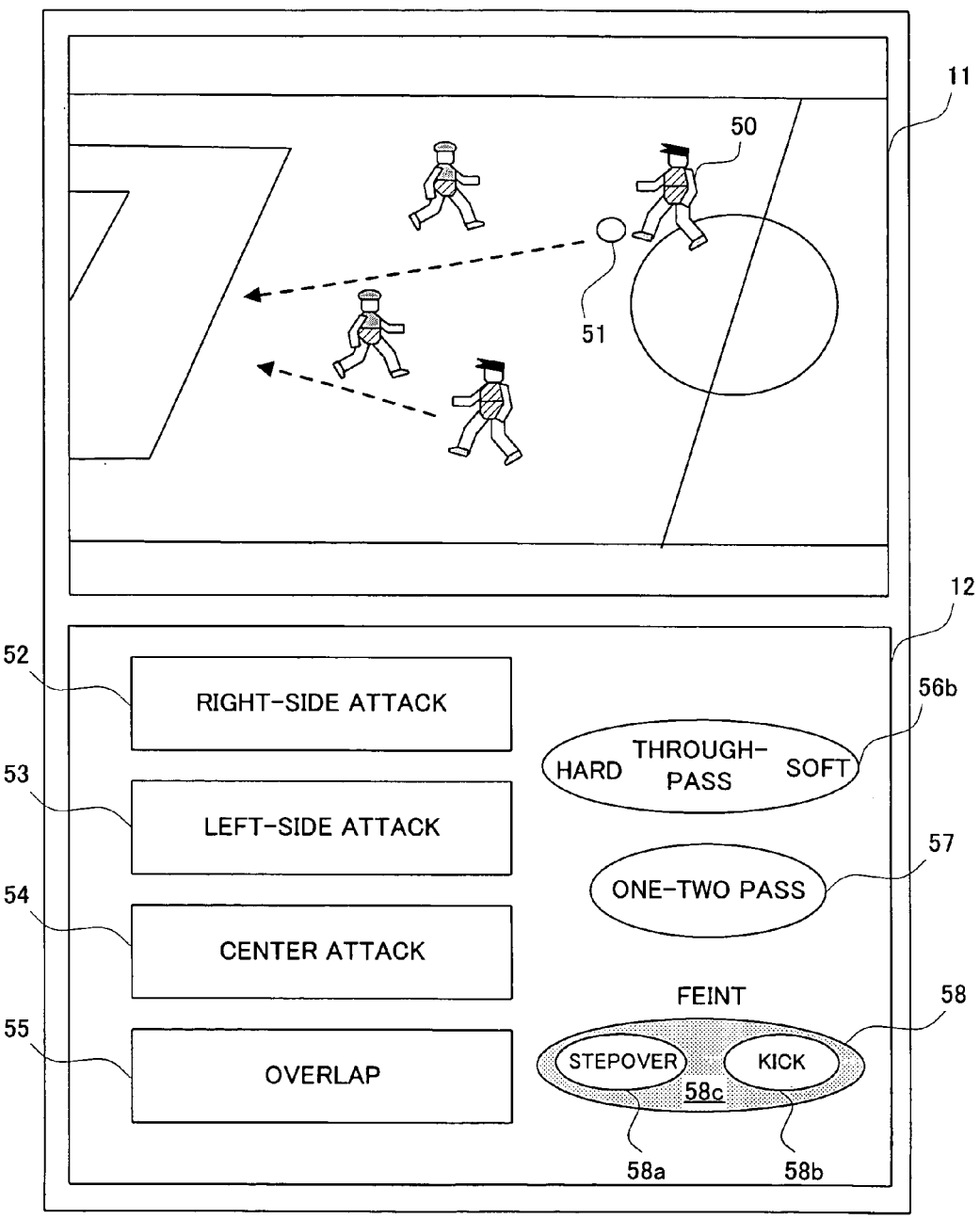
FIG. 5 shows examples of display images on the first and second LCDs 11 and 12 which are displayed in the situation where a character in possession of a ball is able to make a through-pass.

FIG. 5 shows examples of display images on the first and second LCDs 11 and 12 which are displayed in the situation where the selected character 50 is able to make a through-pass (or an effective through-pass). FIG. 5 differs from FIG. 4 in that the size of a button switch image 56*b* associated with "through-pass" is larger than that of the button switch image 56*a* shown in FIG. 4. This allows the player to readily become aware of the situation where the through-pass can be made. Also, the increase in size of the button switch image allows the player to readily depress the button switch. Note that if the player depresses the button switch image 56*a* in the situation as shown in FIG. 4, the selected character 50 simply kicks the ball 51 toward the front, failing in making a through-pass.

Figure 6:
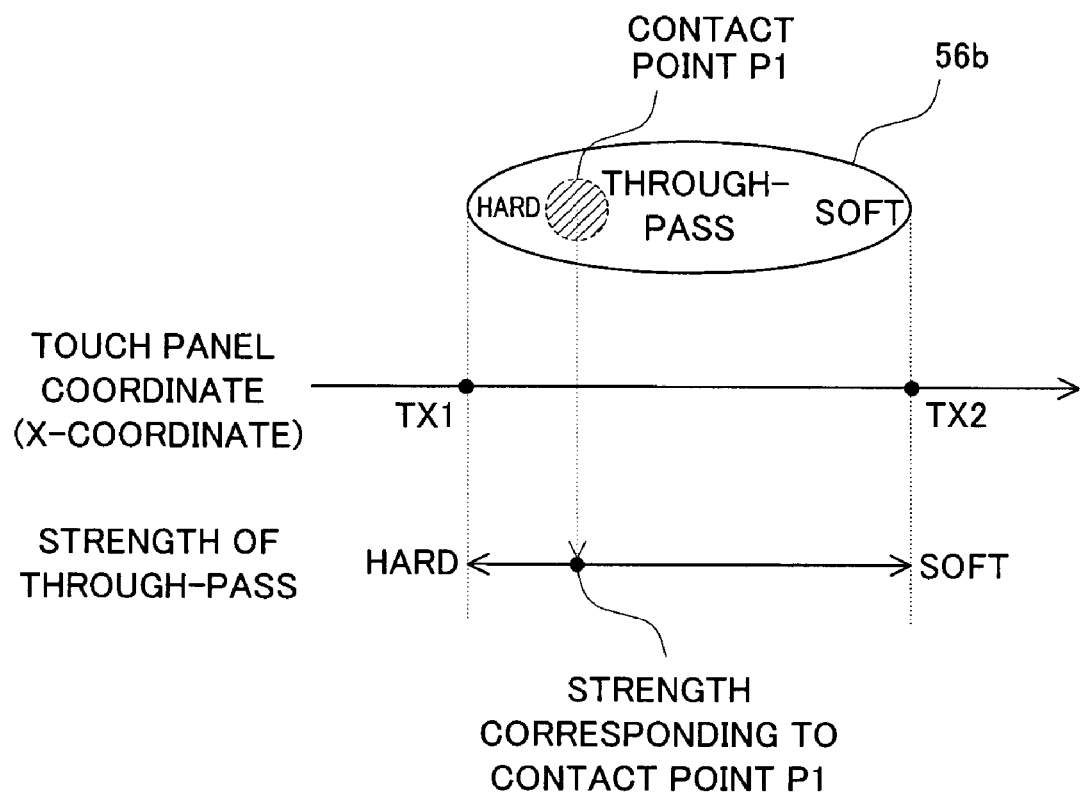
FIG. 6 is a diagram which shows how the strength of a through-pass is determined.

If the player touches the button switch image 56*b* associated with "through-pass", the selected character 50 makes a "through-pass". The strength of the pass varies depending on a portion of the button switch image 56*b* that is touched by the player. The strength of the pass increases toward the left side of the button switch image 56*b,* and decreases toward the right side. Specifically, as shown in FIG. 6, the strength of the through-pass varies depending on an X-coordinate value of contact point P1 at which the stick 17 or a finger touches the button switch image 56*b* (a piece of coordinate data outputted from the touch panel 16). Note that in the coordinate data outputted from the touch panel 16, the horizontal direction of the second LCD 12 corresponds to the X-axis direction, and the vertical direction thereof corresponds to the Y-axis direction. Conventionally, the pass strength generally varies depending on a time period for which the operation switch 15*d,* 15*e,* or the like is kept depressed. It is possible, however, to provide an instruction concerning both the type and intensity of a pass by touching the button switch image 56*b* only once. Accordingly, even a player who is not accustomed to the game is able to freely and readily change the pass strength.

Figure 7:
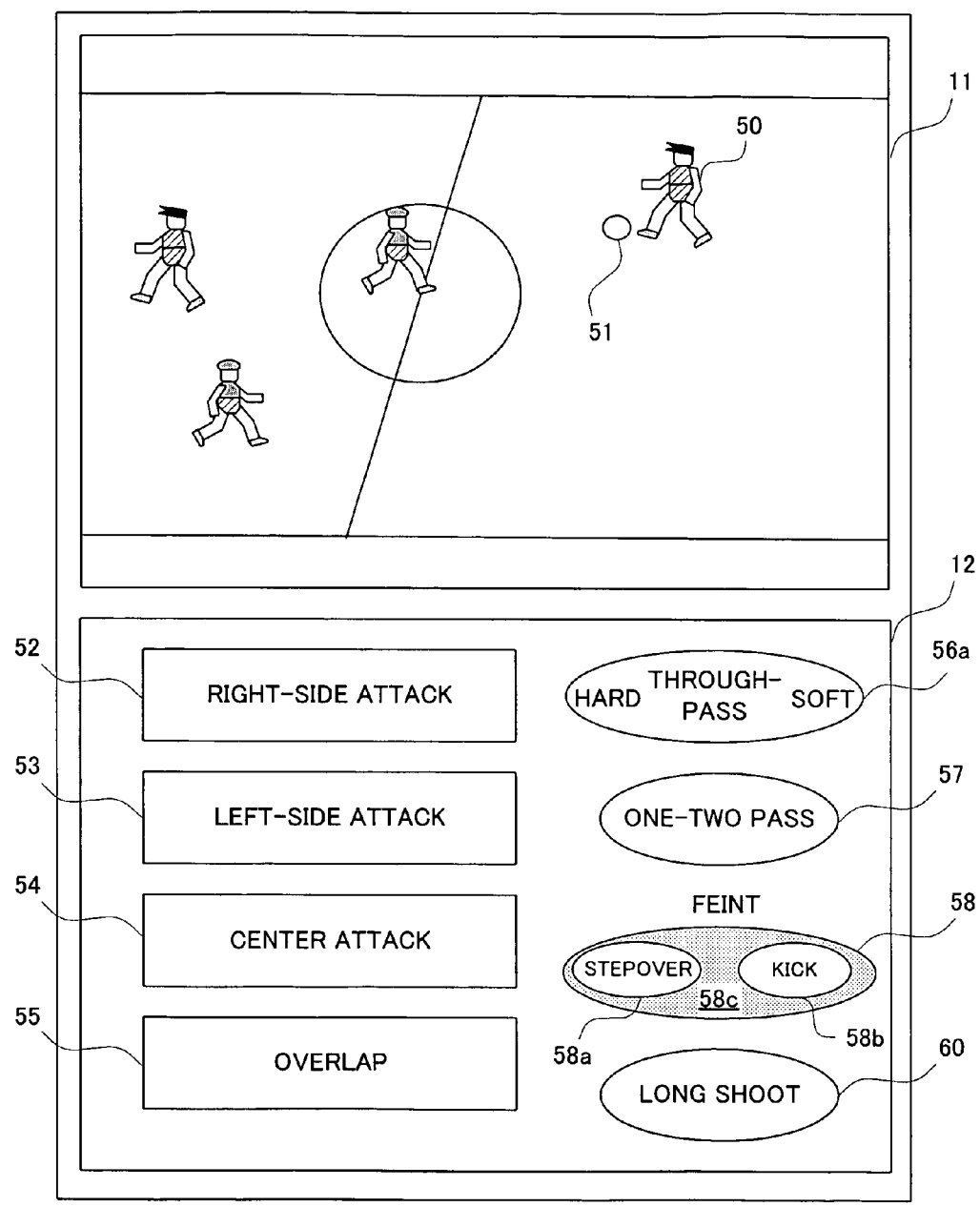
FIG. 7 shows examples of display images on the first and second LCDs 11 and 12 which are displayed in the situation where a character having a special ability keeps a ball.

FIG. 7 shows examples of display images on the first and second LCDs 11 and 12 which are displayed in the situation where a character having a special ability keeps the ball 51. FIG. 7 differs from FIG. 4 in that a button switch image 60 for a "long shoot" is additionally included in the touch panel image. In the case where the selected character 50 has a special ability (in this example, a "long shoot"), the button switch image for executing the special ability is not displayed until the selected character 50 keeps the ball 51. The display of the button switch image 60 allows the player to readily become aware of what kind of skill the selected character 50 has, making it possible to allow the player to readily give an instruction to execute that skill.

Figure 8:
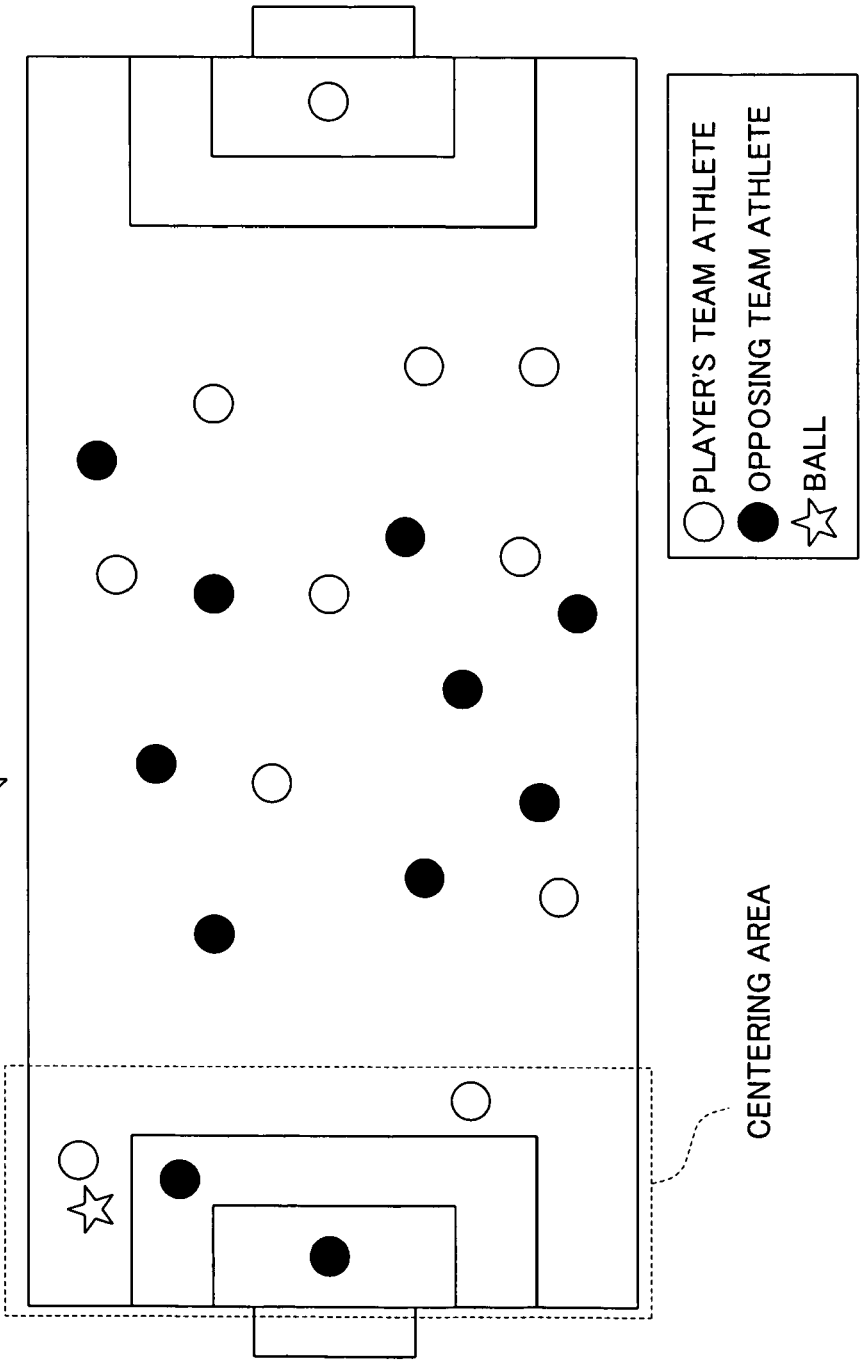
FIG. 8 is a diagram showing a centering area.

Described next is a case where the selected character 50 in possession of the ball 51 enters a centering area. FIG. 8 is a conceptual diagram showing such a situation. In FIG. 8, the centering area is indicated by broken lines.

Figure 9:
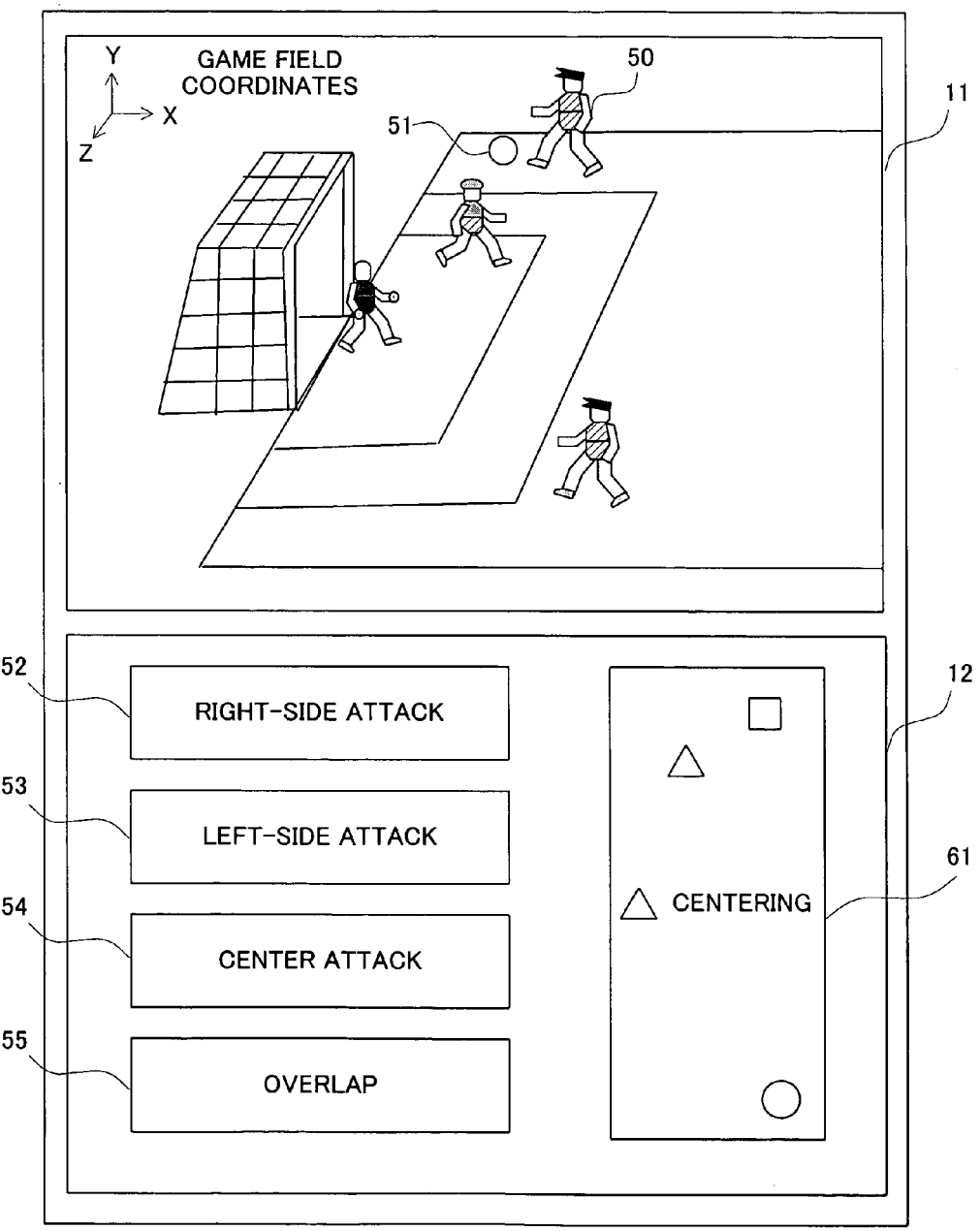
FIG. 9 shows examples of display images on the first and second LCDs 11 and 12 which are displayed in the situation where a character in possession of a ball enters the centering area.

FIG. 9 shows examples of display images on the first and second LCDs 11 and 12 that are displayed in the situation where the selected character 50 in possession of the ball 51 enters the centering area. FIG. 9 differs from FIG. 4 in that a button switch image 61 for "centering" is displayed instead of the button switch images 56*a*, 57, and 58. If the player touches the button switch image 61 associated with "centering", the selected character 50 makes a "centering pass". The target point for a centering pass varies depending on a portion of the button switch image 61 that is touched by the player. This is described in more detail below.

Figure 10:
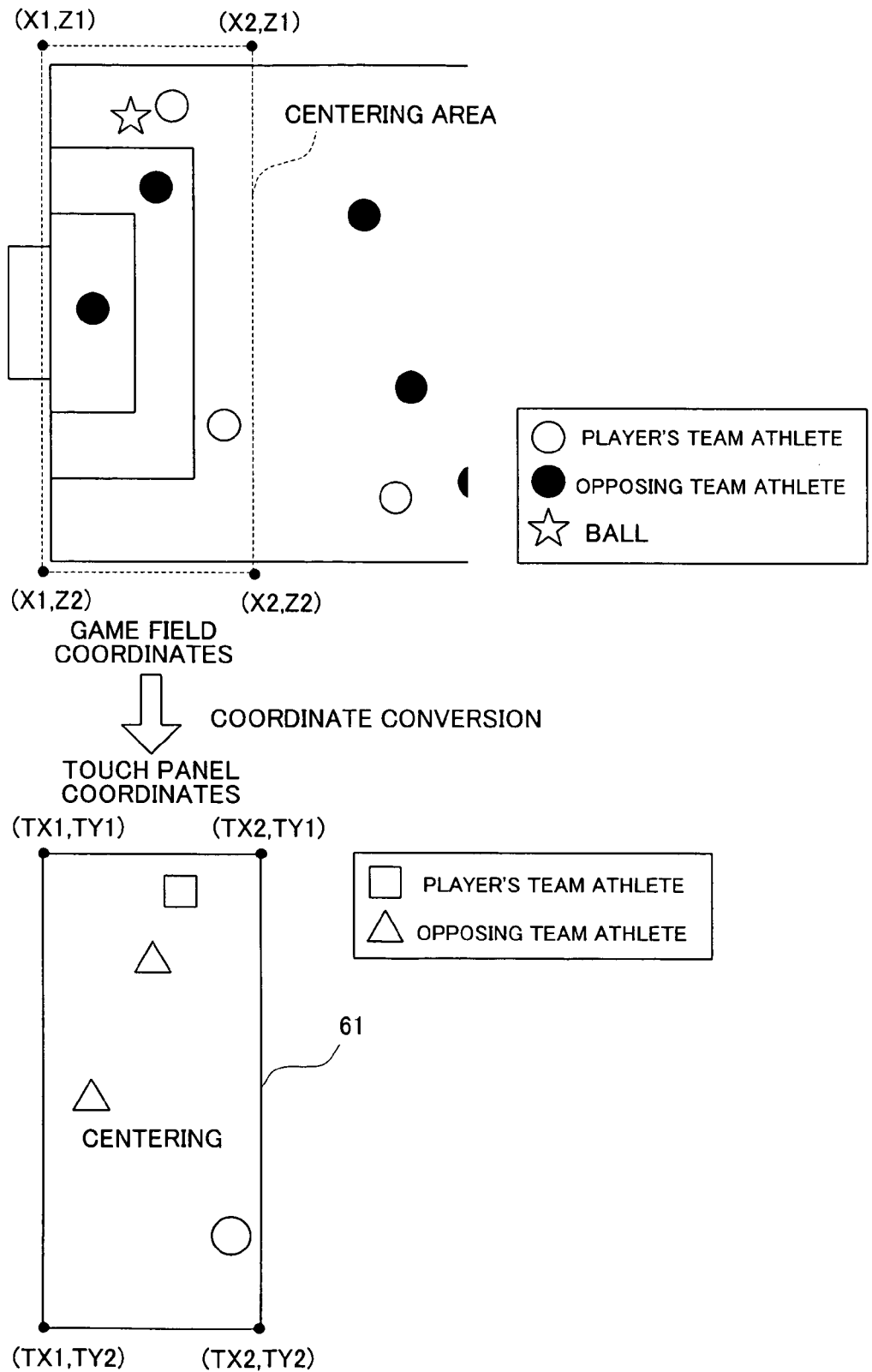
FIG. 10 is a diagram showing the correspondence between a button switch image 61 and a game field.

As shown in FIG. 10, each point in the button switch image 61 for "centering" is associated with a point within the centering area in the game field. Specifically, touch panel coordinates (TX1, TY1) corresponding to a point on the top left corner of the button switch image 61 on the second LCD 12 are associated with game field coordinates (X1, Z1) of a point on the top left corner of the centering area in the game field, and touch panel coordinates (TX2, TY1) corresponding to a point on the top right corner of the button switch image 61 are associated with game field coordinates (X2, Z1) of a point on the top right corner of the centering area. Also, touch panel coordinates (TX1, TY2) corresponding to a point on the bottom left corner of the button switch image 61 are associated with game field coordinates (X1, Z2) of a point on the bottom left corner of the centering area, and touch panel coordinates (TX2, TY2) corresponding to a point on the bottom right corner of the button switch image 61 are associated with game field coordinates (X2, Z2) of a point on the bottom right corner of the centering area. Also, in the touch panel coordinate system, the horizontal direction corresponds to the X-axis direction, and the vertical direction corresponds to the Y-axis direction. Further, each point within an area enclosed by coordinate points (TX1, TY1), (TX2, TY1), (TX1, TY2), and (TX2, TY2) in the touch panel coordinate system is associated with a point within the area enclosed by coordinate points (X1, Z1), (X2, Z1), (X1, Z2), and (X2, Z2) in the game field coordinate system, so as to establish linear relationships between game field coordinates in the centering area and their corresponding touch panel coordinates in the button image. As such, each point in the button switch image 61 is associated with a point in the game field coordinate system. For example, if the player touches a point (TX1, TY1) on the touch panel 16, the selected character 50 makes a centering pass aiming at point (X1, Z1) in the game field as a target point. Note that in the game field coordinate system, a direction of a touch line corresponds to the X-axis direction, a direction of a goal line corresponds to the Y-axis direction, and a vertical direction corresponds to the Z-axis direction.

As shown in FIG. 10, the button switch image 61 for "centering" includes marks indicating the player's team athletes and the opposing team athletes (and also includes a mark indicating the position of a ball). The position of a mark for each athlete within the centering area in the game field is obtained by performing coordinate conversion from game field coordinates to touch panel coordinates. The coordinate conversion between the touch panel coordinates and the game field coordinates can be readily implemented based on the aforementioned correspondences. In this manner, positions of the player's team athletes and the opposing team athletes within the centering area are displayed in the button switch image 61, therefore the player can reference the displayed marks to allow the selected character 50 to make a "centering pass" toward an optimum target point while considering the position of each athlete. Although it is not always necessary to display marks indicating athletes in the button switch image 61 for reasons as described above. Also, instead of displaying marks indicating positions of athletes, an image or a uniform number may be displayed for each athlete.

Figure 11:
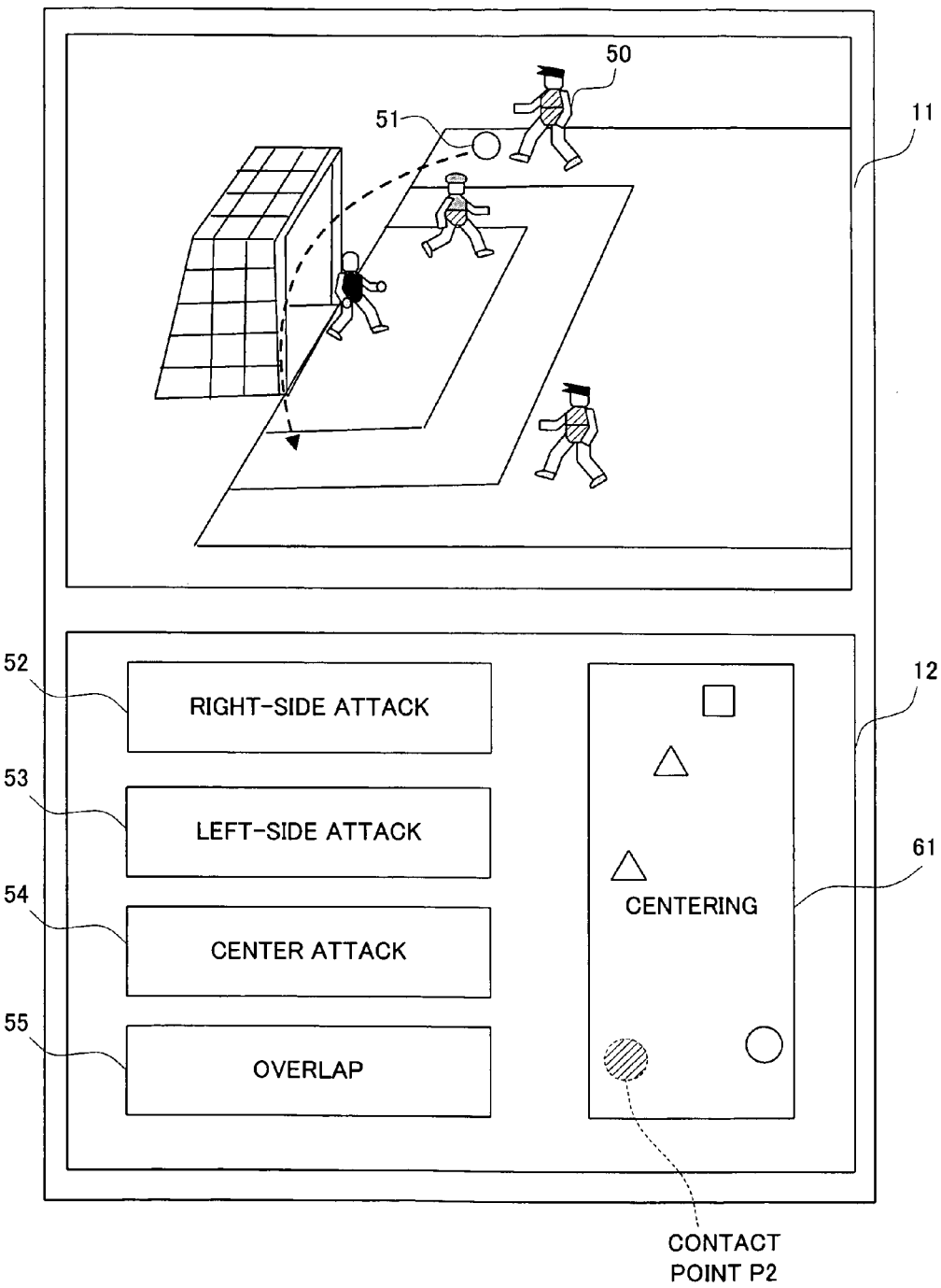
FIG. 11 shows other examples of display images on the first and second LCDs 11 and 12 which are displayed in the situation where a character in possession of a ball enters the centering area.
Figure 12:
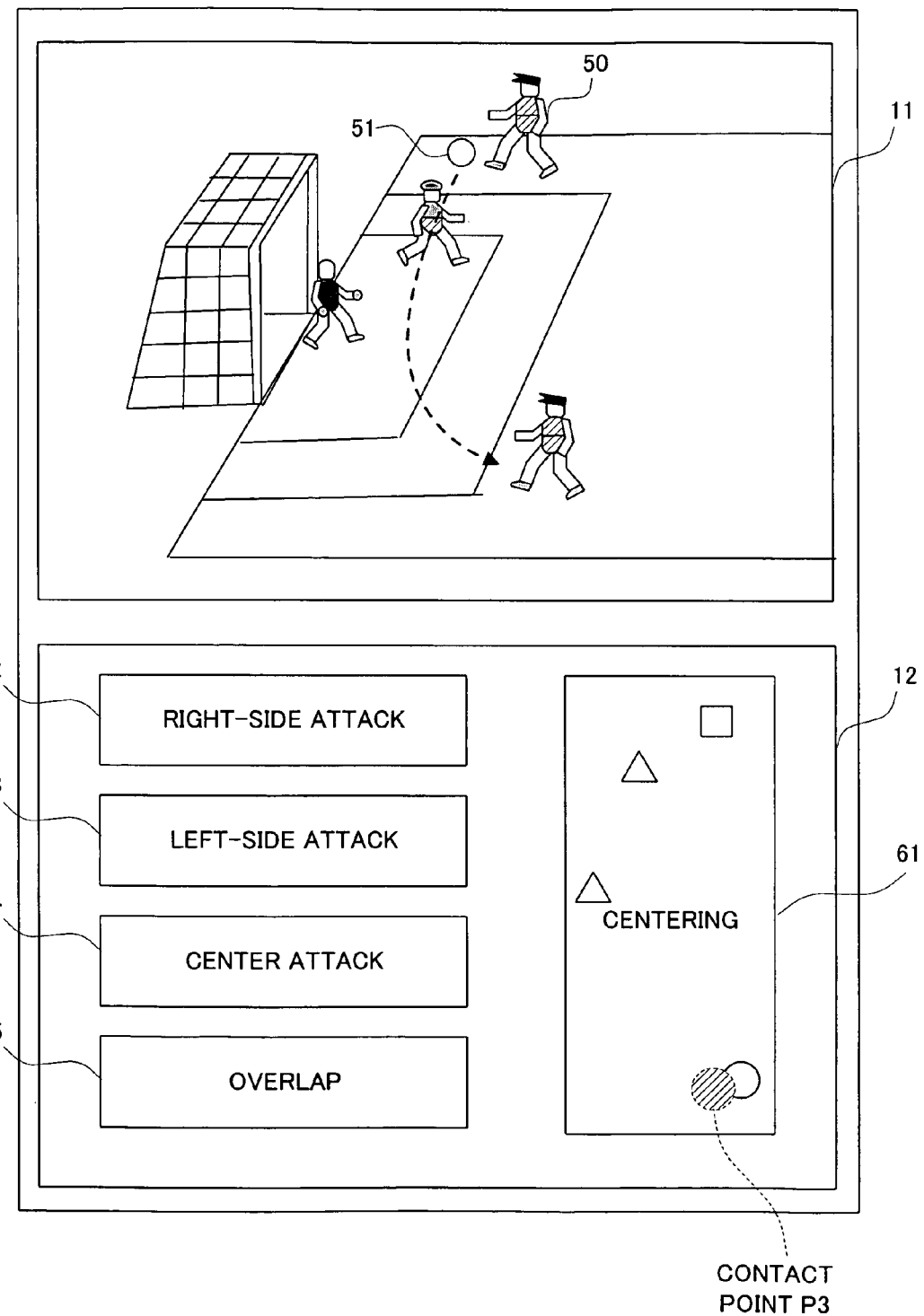
FIG. 12 shows still other examples of display images on the first and second LCDs 11 and 12 which are displayed in the situation where a character in possession of a ball enters the centering area.
Figure 13:
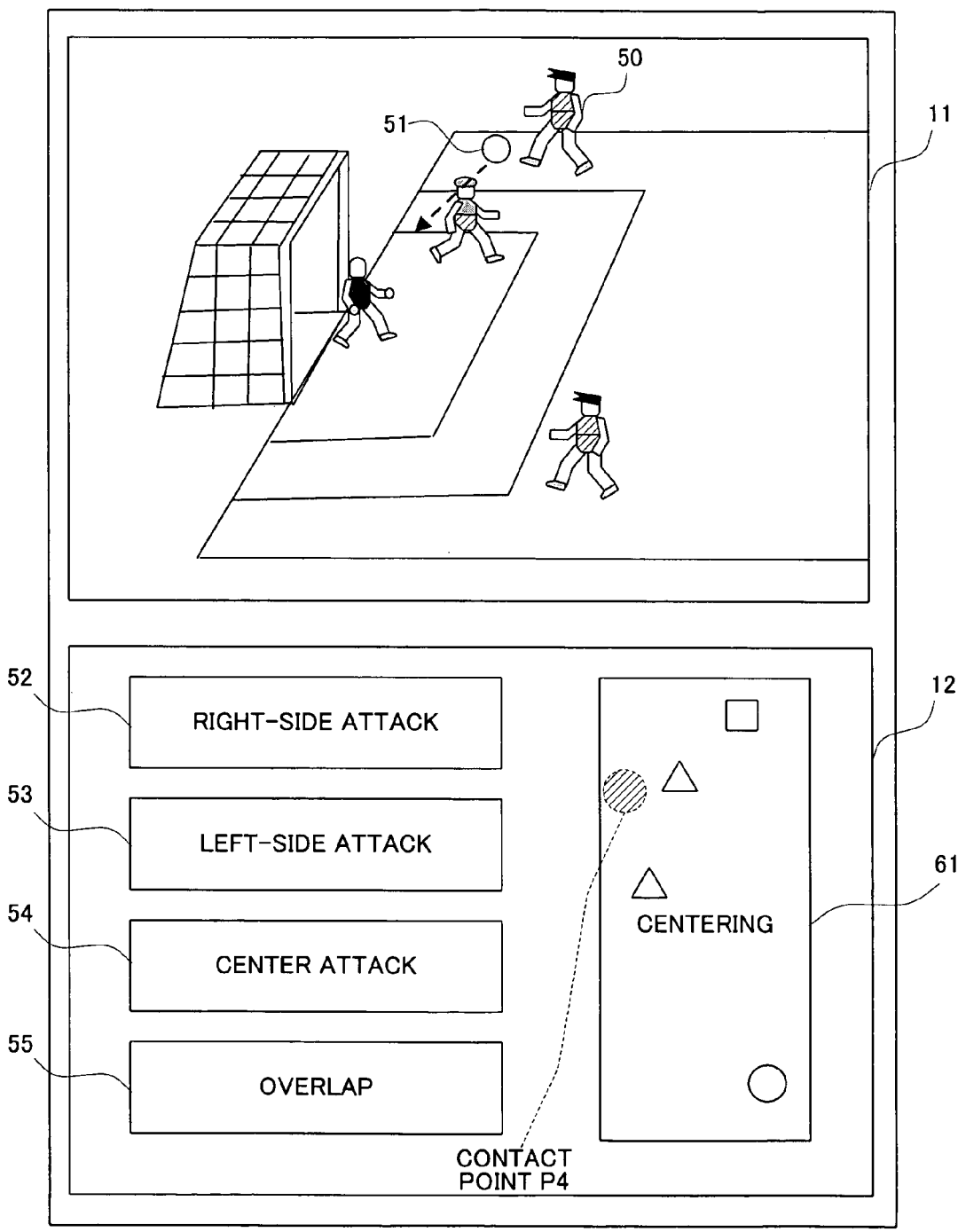
FIG. 13 shows still other examples of display images on the first and second LCDs 11 and 12 which are displayed in the situation where a character in possession of a ball enters the centering area.

FIG. 11 shows other examples of display images on the first and second LCDs 11 and 12 which are displayed in the situation where the selected character 50 enters the centering area. If the player touches contact point P2 shown in FIG. 11, game field coordinates of a target point for centering are obtained based on touch panel coordinates of contact point P2, and the selected character 50 makes a "centering pass" toward this target point (see the arrow shown in FIG. 11). Similarly, if the player touches contact point P3 shown in FIG. 12, the selected character 50 makes a "centering pass" toward a target point corresponding to contact point P3 (see the arrow shown in FIG. 12). Also, if the player touches contact point P4 shown in FIG. 13, the selected character 50 makes a "centering pass" toward a target point corresponding to contact point P4 (see the arrow shown in FIG. 13). Accordingly, even a player who is not accustomed to operating the game can readily allow the selected character 50 to make a "centering pass" toward a desired target point. Further, the player can simultaneously provide an instruction concerning "centering" and an instruction concerning the target point by touching the button switch image 61 associated with "centering" only once, and therefore it is possible to quickly enter instructions adapted to real-time progression of the game. Furthermore, marks associated with a displayed region of the button switch image 61 and showing where game characters (athlete characters) are located in the game field are displayed in the button switch image 61, and therefore even a beginner is able to carry out an intuitive operation in a simple manner because it is possible to make a "centering pass" toward an athlete character in the player's team by, for example, touching the mark of that player character as shown in FIG. 12.

A point in the game field is selected as a target point for centering in accordance with a contact point on the button switch image 61. Alternatively, it may be so configured that a centering pass is made to a player character displayed in the button switch image 61 when a mark indicating that player character is touched.

Figure 14:
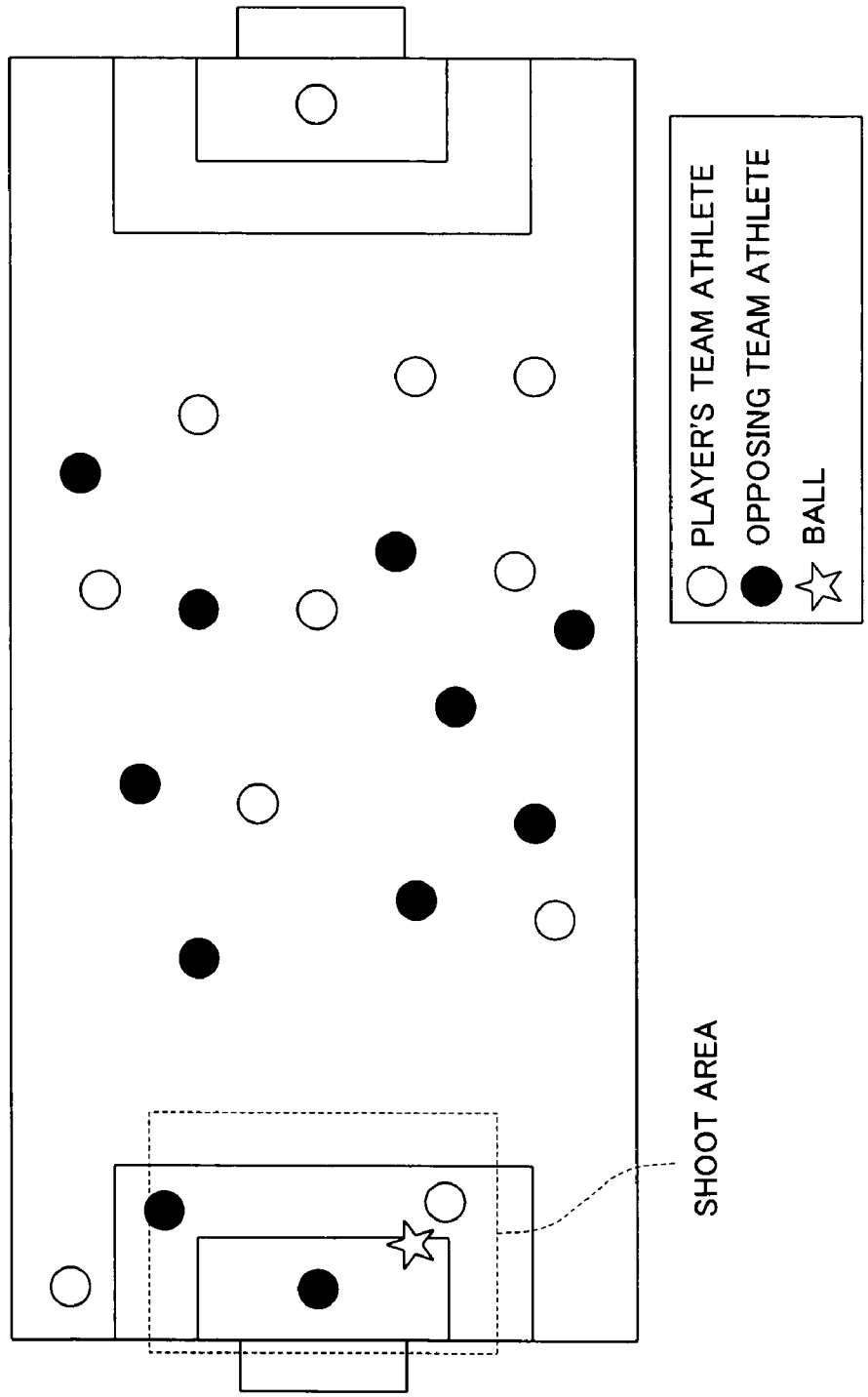
FIG. 14 is a diagram showing a shoot area.

An exemplary case, where the selected character 50 in possession of the ball is a forward (FW) and enters a shoot area, is described next. FIG. 14 is a conceptual diagram showing the game situation in such a case. In FIG. 14, the shoot area is indicated by broken lines.

Figure 15:
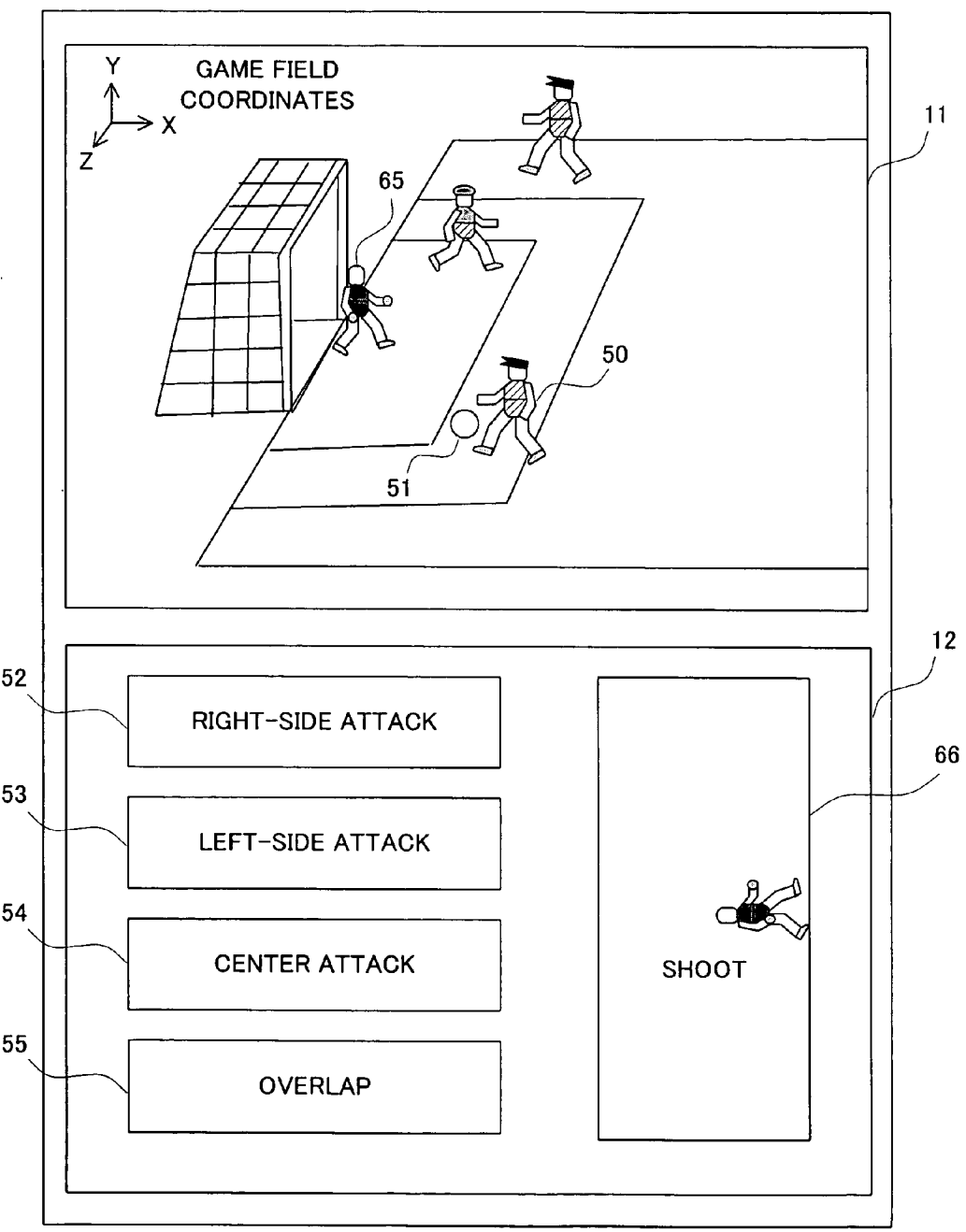
FIG. 15 shows examples of display images on the first and second LCDs 11 and 12 which are displayed in the situation where a character in possession of a ball enters the shoot area.

FIG. 15 shows examples of display images on the first and second LCDs 11 and 12 which are displayed in the situation where the selected character 50 in possession of the ball 51 enters the shoot area. FIG. 15 differs from FIG. 9 in that a button switch image 66 for "shoot" is displayed instead of the button switch image 61. If the player touches the button switch image 66 associated with "shoot", the selected character 50 takes a shot. A target point for the shot (toward which a shot ball travels) varies depending on the portion of the button switch image 66 that is touched by the player. This is described in more detail below.

Figure 16:
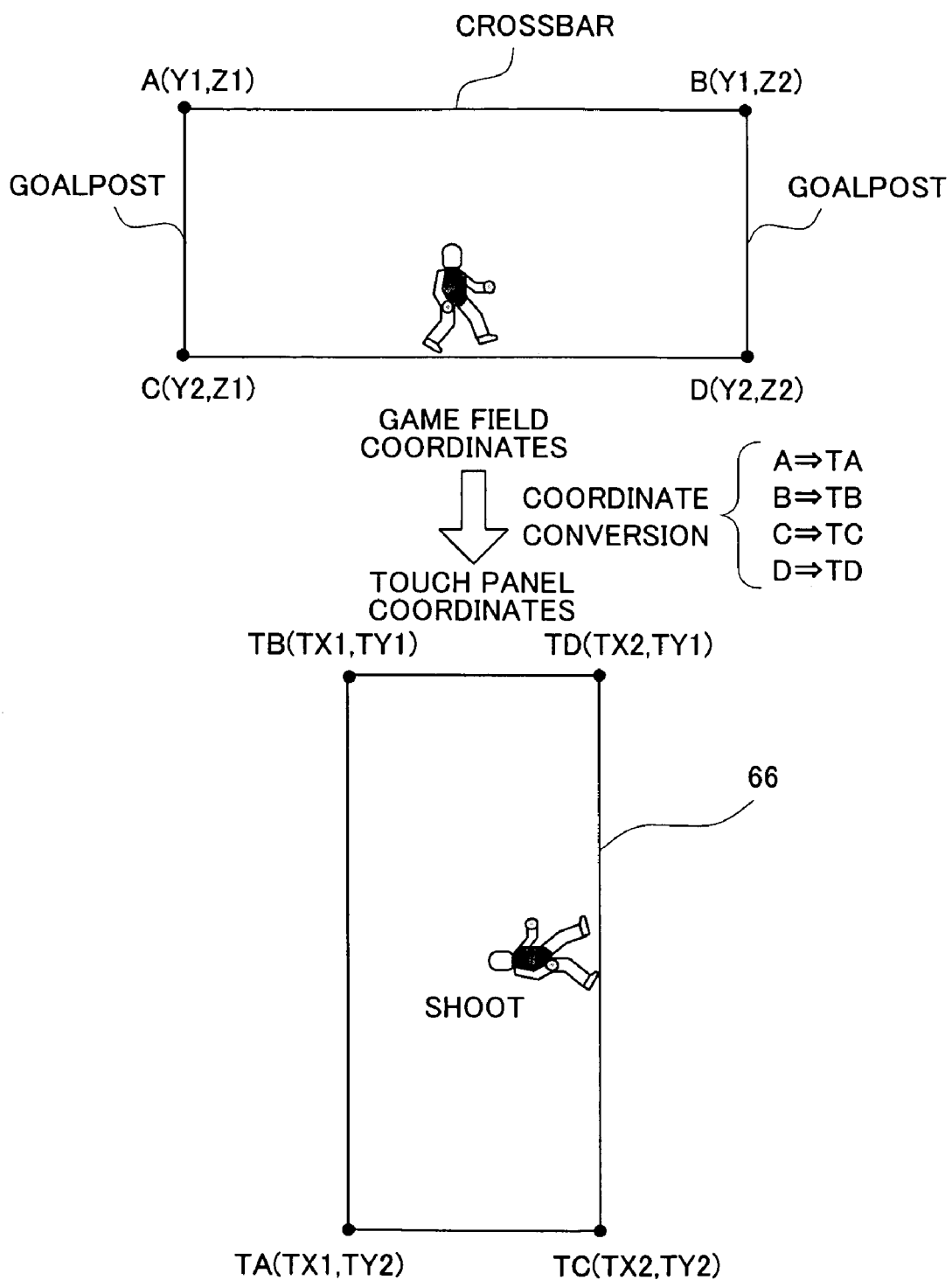
FIG. 16 is a diagram showing the correspondence between a button switch image 66 and a game field.

As shown in FIG. 16, each point within the button switch image 66 for "shoot" corresponds to a point in a goal mouth area in the game field (an area enclosed by a crossbar, goalposts, and the ground in a vertical plane including an end line). For example, point A (Y1, Z1) in the game field coordinate system corresponds to point TA (TX1, TY2) in the touch panel coordinate system, and point B (Y1, Z2) in the game field coordinate system corresponds to point TB (TX1, TY1) in the touch panel coordinate system. Other points in the game field coordinate system shown in FIG. 16 have a similar correspondence with points in the touch panel coordinate system. Also, each point within the goal mouth area is associated with a corresponding point in the touch panel coordinate system, so as to establish linear relationships between game field coordinates in the goal mouth area and their corresponding touch panel coordinates in the button image. For example, if the player touches point TA (TX1, TY2) on the touch panel 16, point A (Y1, Z1) in the game field is obtained as a corresponding coordinate point, so that the selected character 50 takes a shot toward a point at game field coordinates (Xe, Y1, Z1), where Xe is an X-coordinate on the end line.

As shown in FIG. 16, an image of a keeper 65 on the opposing team is displayed in the button switch image 66 for "shoot." The position of the image of the keeper 65 in the button switch image 66 is obtained by converting the game field coordinates of the keeper 65 in the game field to touch panel coordinates. The image of the keeper 65 is located in a position corresponding to the position of the keeper 65 when the goal mouth area is viewed from the selected character 50. The position of the keeper 65 can be obtained by simple coordinate conversion. As such, the position of the keeper 65 can be obtained based on the button switch image 66, therefore the player can reference the displayed image of the keeper 65 to allow the selected character 50 to take a shot toward an optimum target point with consideration of the position of the keeper 65. Although it is not always necessary to display the image of the keeper 65 in the button switch image 66 for reasons as described above. Also, instead of displaying the image of the keeper 65, an image, name, or uniform number of the keeper 65 may be displayed. Also, images of other athletes, as well as the image of the keeper 65, may be displayed in the button switch image 66. Also, as shown in FIG. 16, the button switch image 66 is displayed such that the left end of the button switch image 66 corresponds to the crossbar in the game field, and the right end of the button switch image 66 corresponds to the ground in the game field. However, the button switch image 66 may be displayed in a different manner. For example, the button switch image 66 may be displayed such that the top end of the button switch image 66 corresponds to the crossbar in the game field, and the bottom end of the button switch image 66 corresponds to the ground in the game field.

Figure 17:
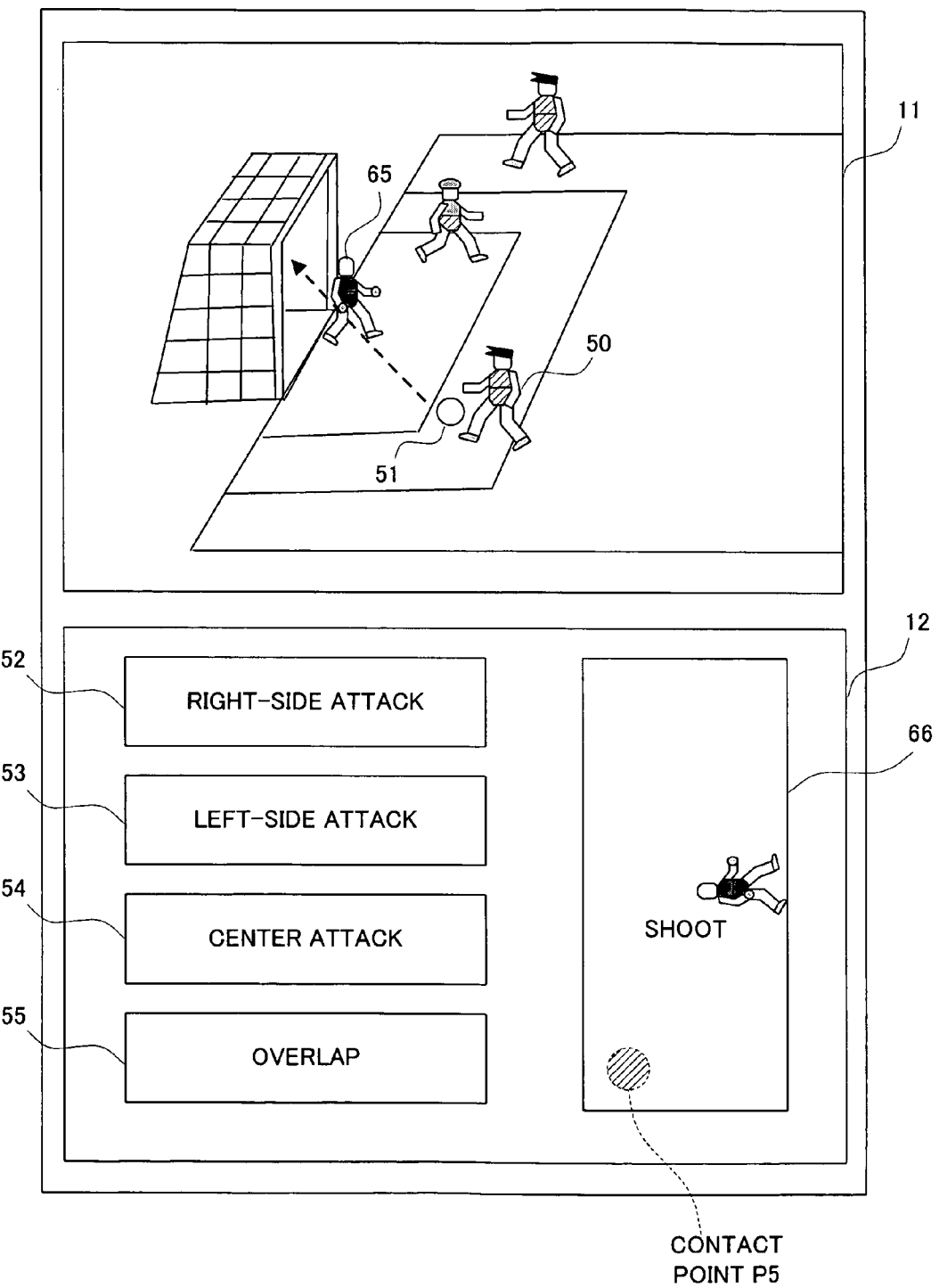
FIG. 17 shows other examples of display images on the first and second LCDs 11 and 12 which are displayed in the situation where a character in possession of a ball enters the shoot area.
Figure 18:
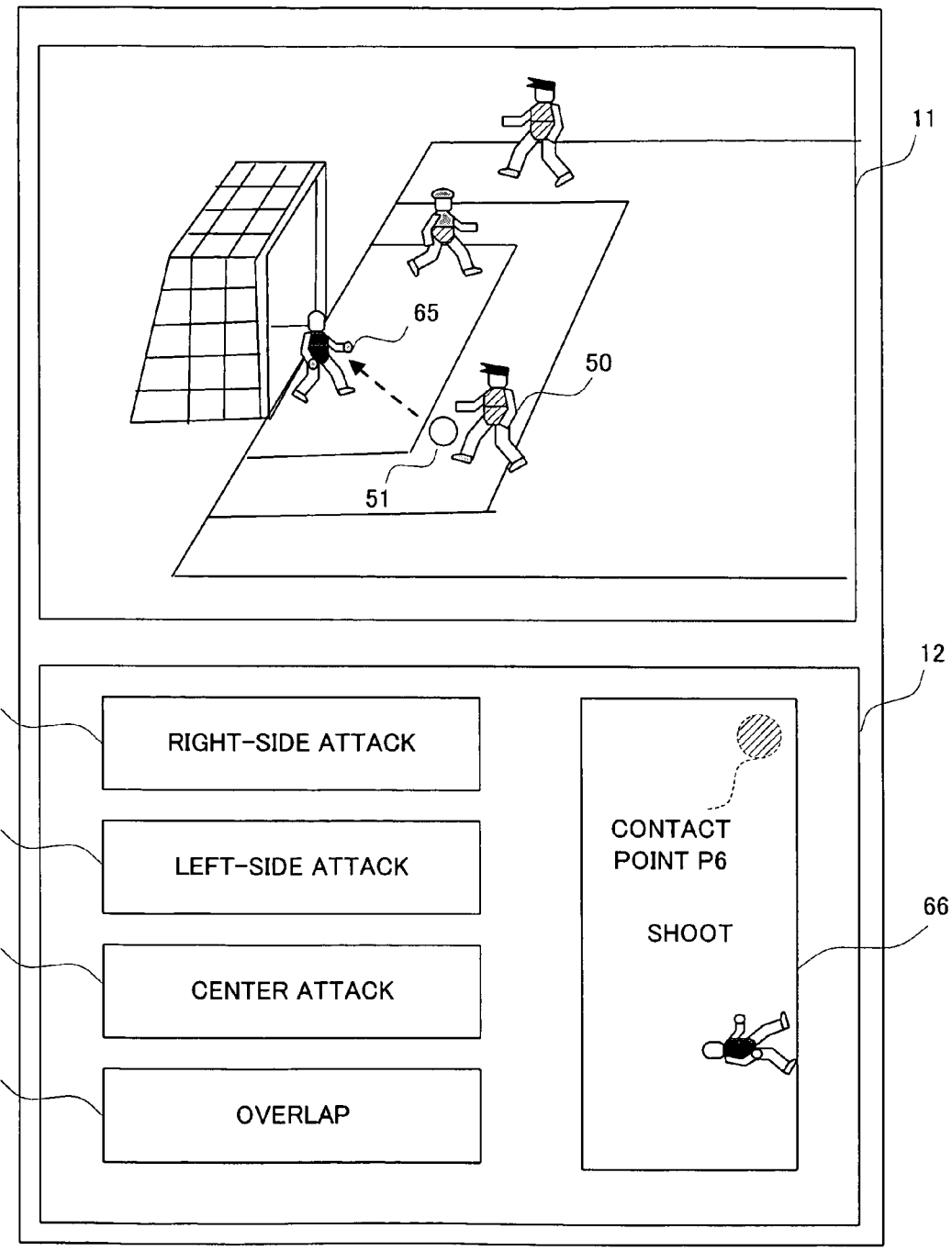
FIG. 18 shows still other examples of display images on the first and second LCDs 11 and 12 which are displayed in the situation where a character in possession of a ball enters the shoot area.

FIG. 17 shows other examples of display images on the first and second LCDs 11 and 12 which are displayed in the situation where the selected character 50 enters the shoot area. If the player touches contact point P5 shown in FIG. 17, game field coordinates of a shot target point are obtained based on touch panel coordinates of contact point P5, and the selected character 50 takes a shot toward this target point (see the arrow shown in FIG. 17). Similarly, if the player touches contact point P6 shown in FIG. 18, the selected character 50 takes a shot toward a target point corresponding to contact point P6 (see the arrow in FIG. 18). In this manner, even a player who is not accustomed to operating the game can readily allow the selected character 50 to take a shot toward a desired target point. Further, the player can simultaneously provide an instruction to "shoot" and an instruction selecting the target point by touching the button switch image 66 associated with "shoot" only once, and therefore it is possible to quickly enter instructions adapted to real-time progression of the game.

Figure 19:
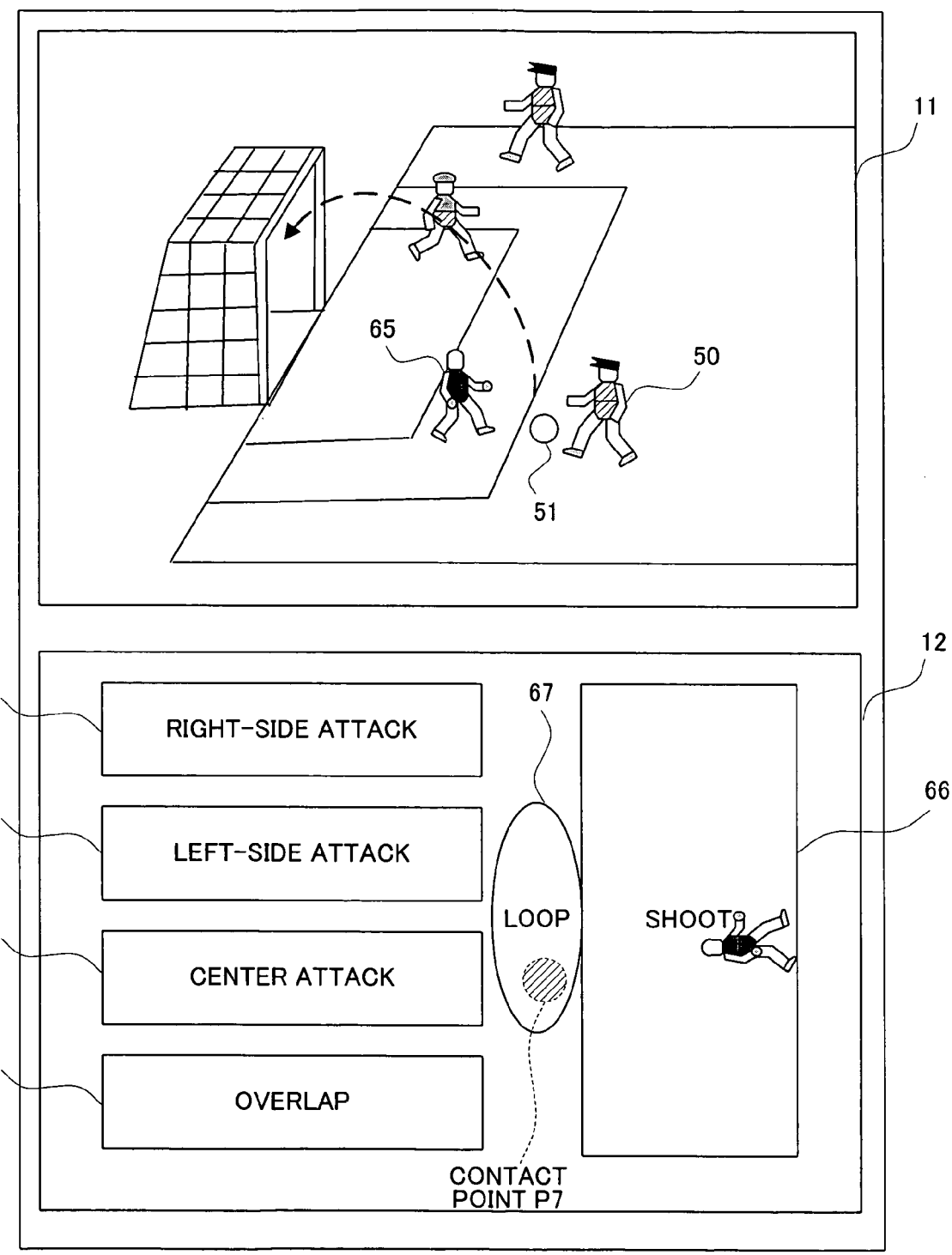
FIG. 19 shows still other examples of display images on the first and second LCDs 11 and 12 which are displayed in the situation where a character in possession of a ball is able to make a loop shoot.

If the keeper 65 in the opposing team moves away from the goal and close to the selected character 50 (for example, the keeper moves out of the goal area), as shown in FIG. 19, a button switch image 67 associated with "loop shoot" is additionally displayed in the touch panel image. Here, the term "loop shoot" refers to a shoot which allows the ball 51 to travel over the head of the keeper 65 while drawing a gentle curve. Accordingly, in the example of FIG. 19, in order to allow an intuitive operation, the button switch image 67 associated with "loop shoot" is located on the left to the button switch image 66 (i.e., over the head of the keeper displayed in the button switch image 66). However, the button switch image 67 may be located in another position. If the player touches contact point P7 shown in FIG. 19, game field coordinates of the target point for a loop shoot is obtained based on touch panel coordinates of contact point P7, and the selected character 50 makes a loop shot toward the target point (see the arrow in FIG. 19). In this manner, by displaying a button switch image depending on the situation, it is made possible to allow the player to become aware of the situation where the button switch should be depressed (or can be used). It is also made possible to cause the button switch image not to be displayed if it is not necessary, and to prevent the number of types of button switch images that are displayed at the same time from increasing, thereby limiting confusion.

Figure 20:
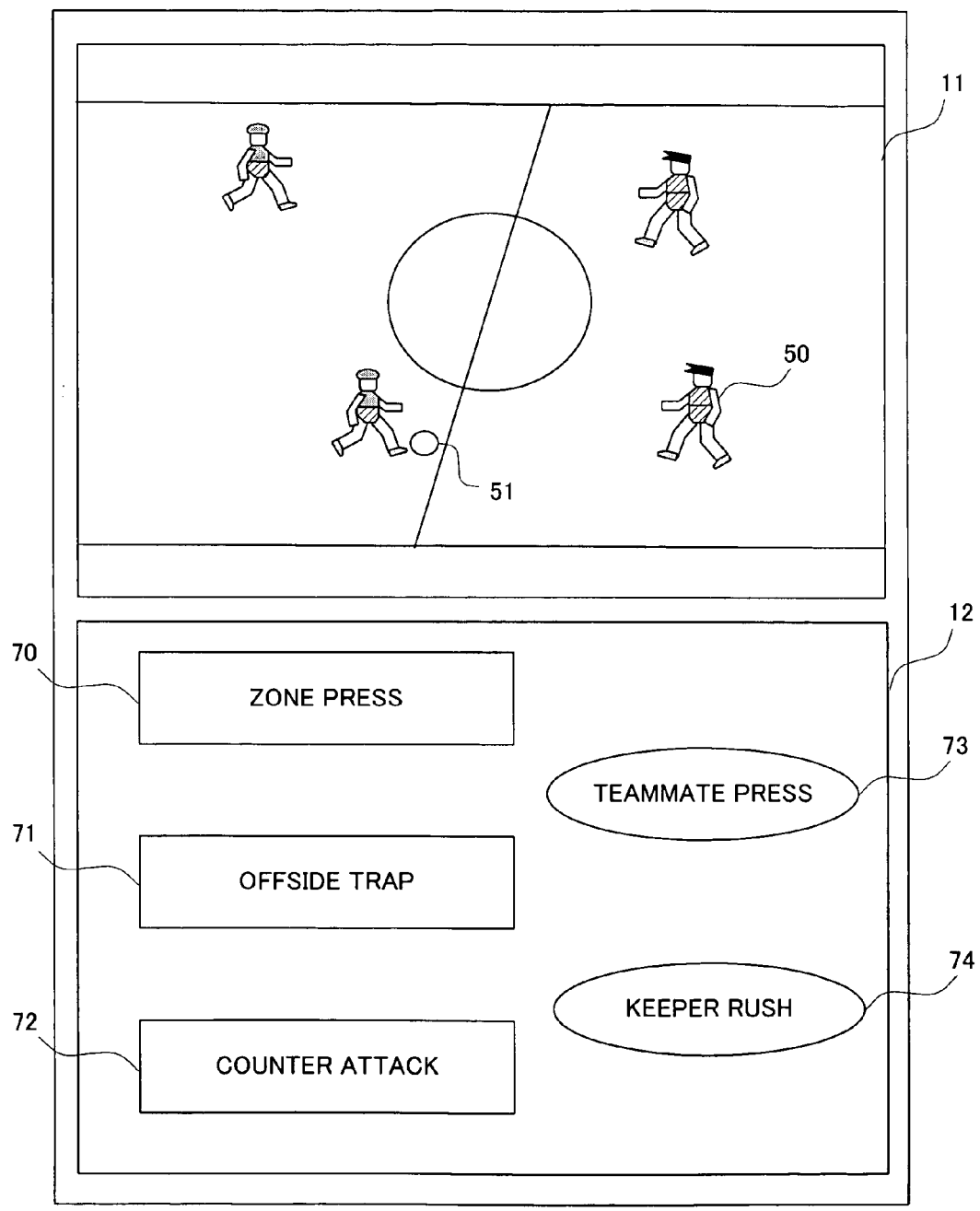
FIG. 20 shows examples of display images on the first and second LCDs 11 and 12 which are displayed in the case of a defense.

FIG. 20 shows examples of display images on the first and second LCDs 11 and 12 which are displayed in the situation where the opposing team keeps the ball (i.e., the player's team is on defense). In FIG. 20, rectangular button switch images for entering instructions concerning the offense strategy of the player's team have been changed to those for use in defense. Also, in addition to the rectangular button switch images 70-72, oval button switch images 73 and 74 are displayed. The button switch image 73 is intended for allowing an athlete on the player's team that is closest to the ball 51 to move toward the opposing team's athlete that keeps the ball 51. Also, the button switch image 74 is intended for allowing the keeper on the player's team to move toward the opposing team's athlete that keeps the ball 51 (for example, an athlete which attempts to make a shot). In this manner, the touch panel image that is to be displayed on the second LCD 12 varies depending on whether the player's team is on offense or defense.

Figure 21:
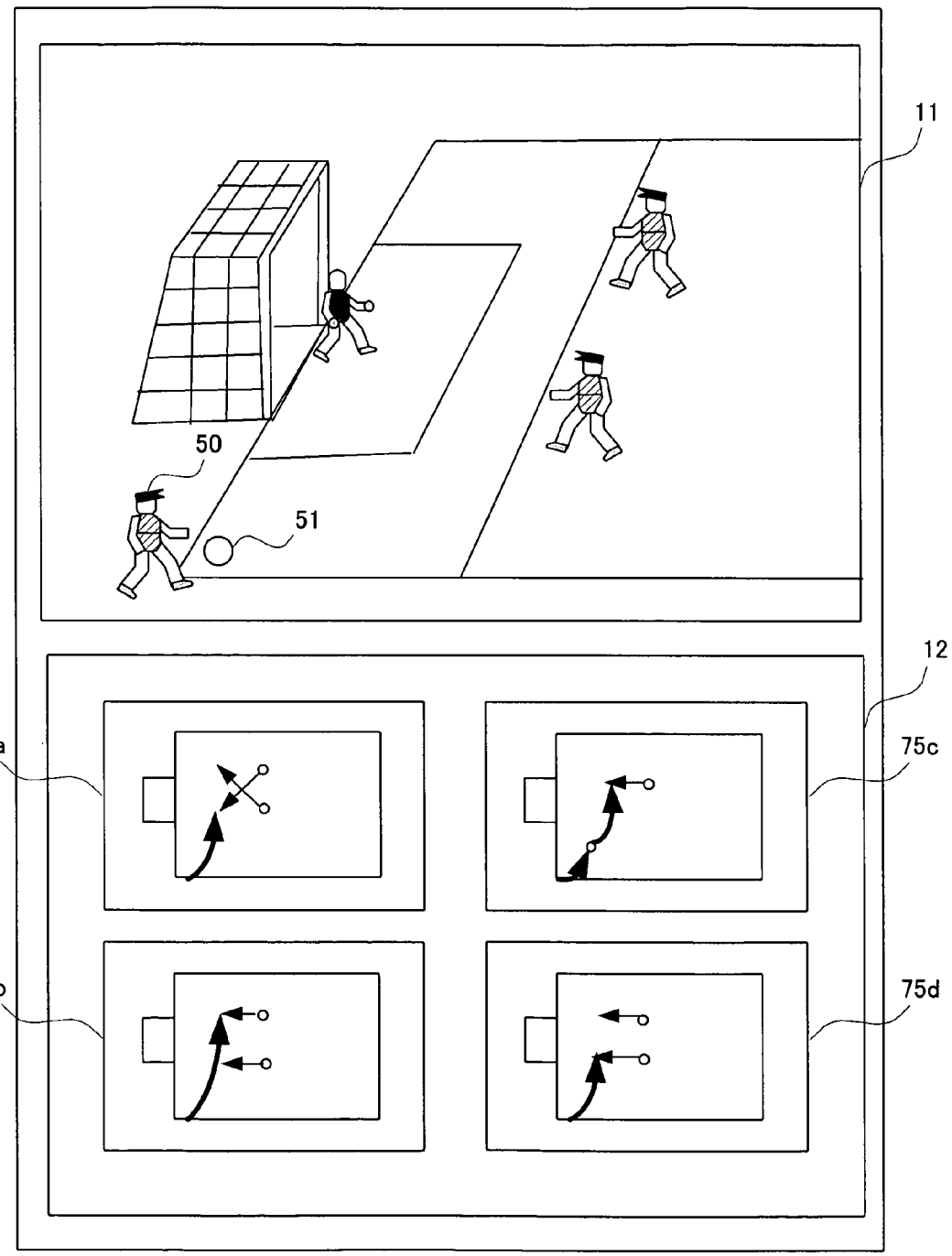
FIG. 21 shows examples of display images on the first and second LCDs 11 and LCD 12 which are displayed in the case of a corner kick.

FIG. 21 shows examples of display images on the first and second LCDs 11 and LCD 12 which are displayed in the case of a corner kick. Here, the touch panel image includes four button switch images 75a-75d. The button switch images 75a-75d change in an animated manner, and represent by animation how athletes in the player's team move and how a ball 51 kicked from a corner travels immediately after the selected character 50 kicks the ball 51 (i.e., immediately after the corner kick). The player sees the animated representation of each of the button switch images 75a-75d, and touches a button switch image corresponding to a desired formation with the stick 17 or a finger. Thereafter, the ball kicked from the corner moves as shown in the touched button switch image, and each athlete in the game field moves as shown in the touched button switch image. After the corner kick, the player is able to control the action of the selected character by using the cross key, A button, B button, etc. Also, non-selected characters move as usual in accordance with a program after they move as shown in the touched button switch image. In this manner, details of each formation which can be selected by the player are shown by animation during a set play such as a corner kick or a free kick. Accordingly, the player can readily recognize and select even a complicated formation.

In the example of FIG. 21, each of the button switch images 75a-75d is displayed by animation, though still images simply showing a formation may be used.

Hereinbelow, exemplary data in the ROM 180 of the game cartridge 18 which is used for executing the above-described game is described.

Figure 22:
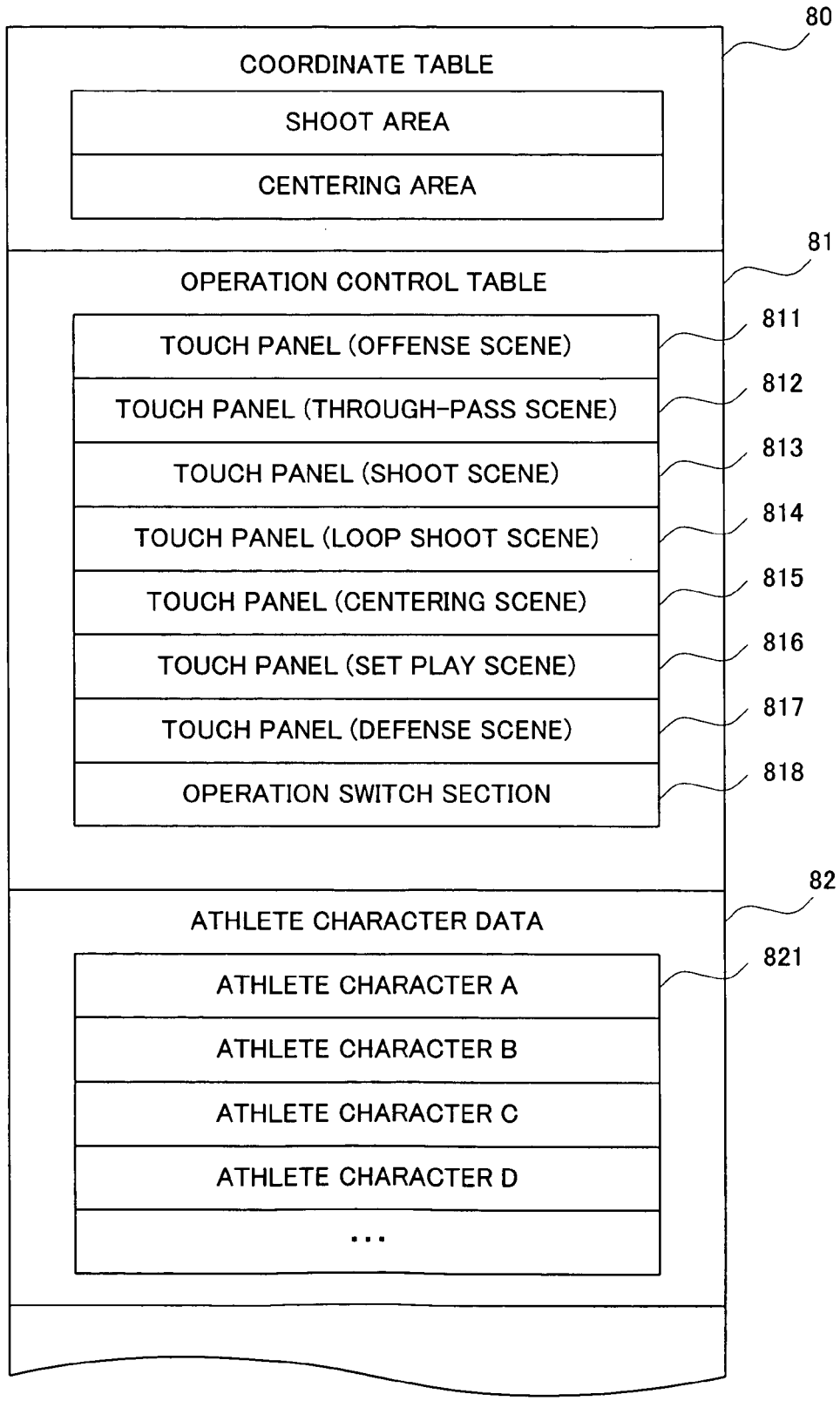
FIG. 22 shows a portion of a memory map of a ROM 180.
Figure 23:
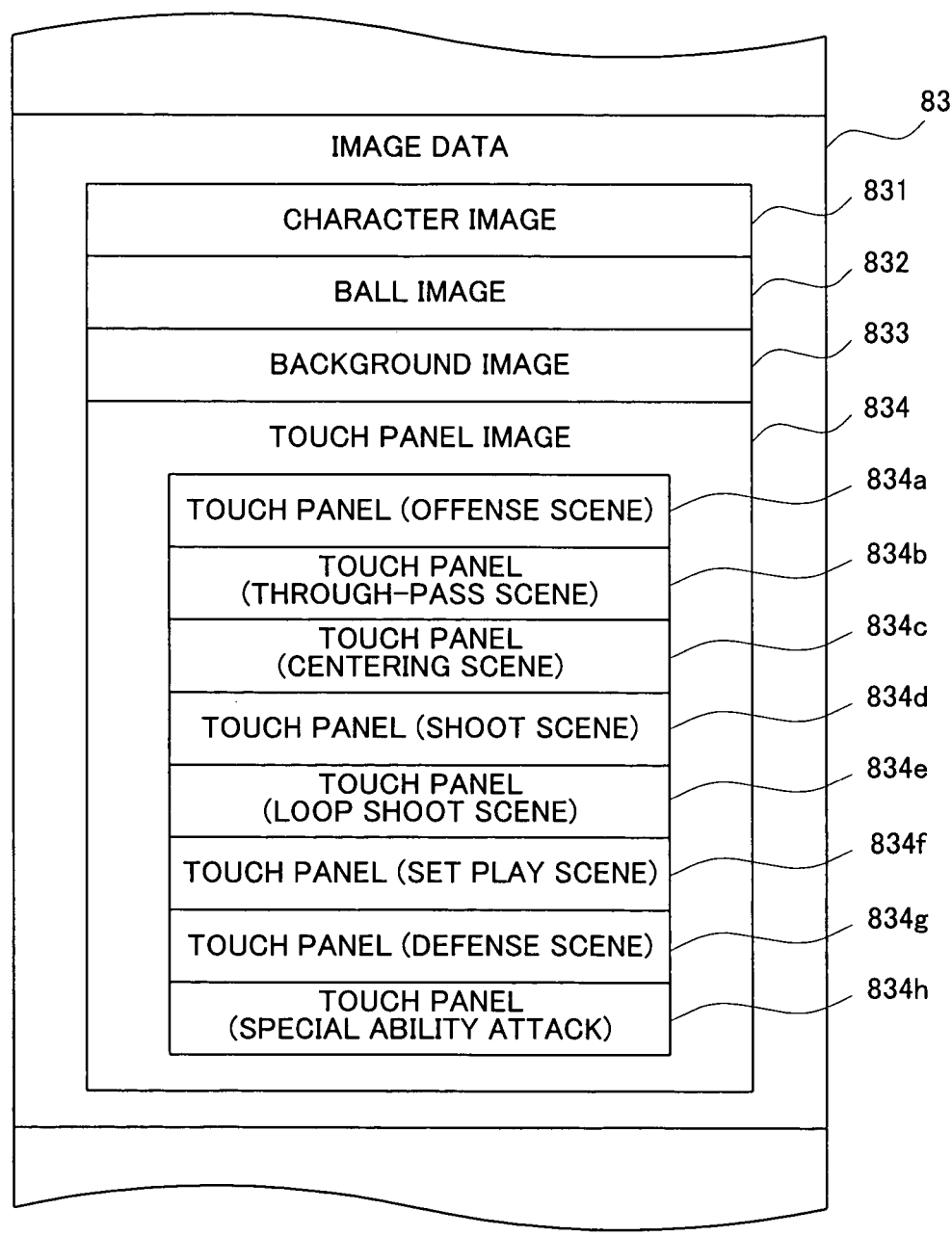
FIG. 23 shows another portion of the memory map of the ROM 180.
Figure 24:
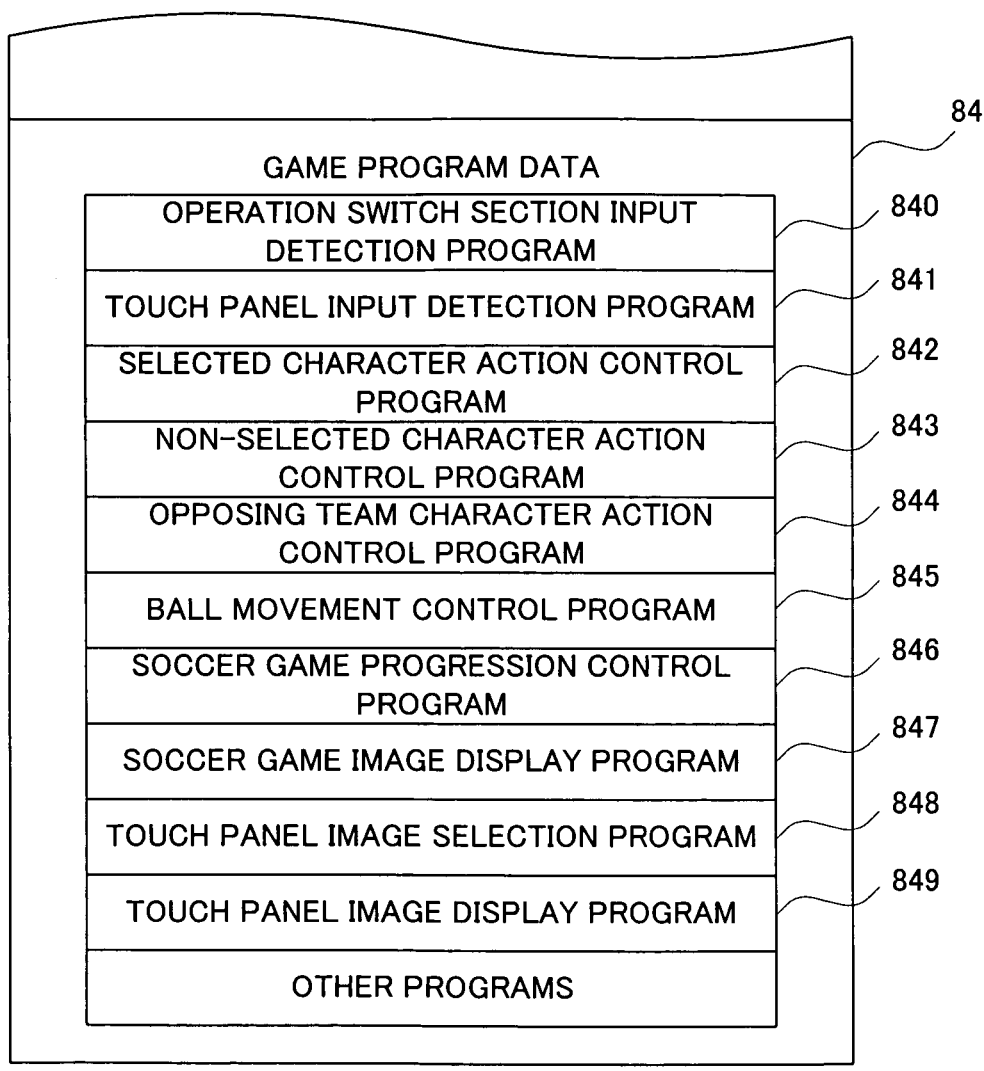
FIG. 24 shows still another portion of the memory map of the ROM180.

FIGS. 22-24 are memory maps of an exemplary illustrative ROM 180. The ROM 180 has stored therein a coordinate table 80, an operation control table 81, player character data 82, image data 83, game program data 84, etc.

The coordinate table 80 is data which defines ranges of the shoot area and the centering area in the game field.

The operation control table 81 is data for interpreting the player's operation on the operation switch section 15 and the touch panel 16. The operation control table 81 is roughly divided into operation control tables 811-817, which define control details when the touch panel 16 is operated, and an operation control table 818 which defines control details when the operation switch section 15 is operated. Further, as described above, the touch panel image changes depending on the game situation or character attribute values, and therefore the operation control tables 811-817 are provided in order to be adapted to the changes of the touch panel image.

Figure 25:
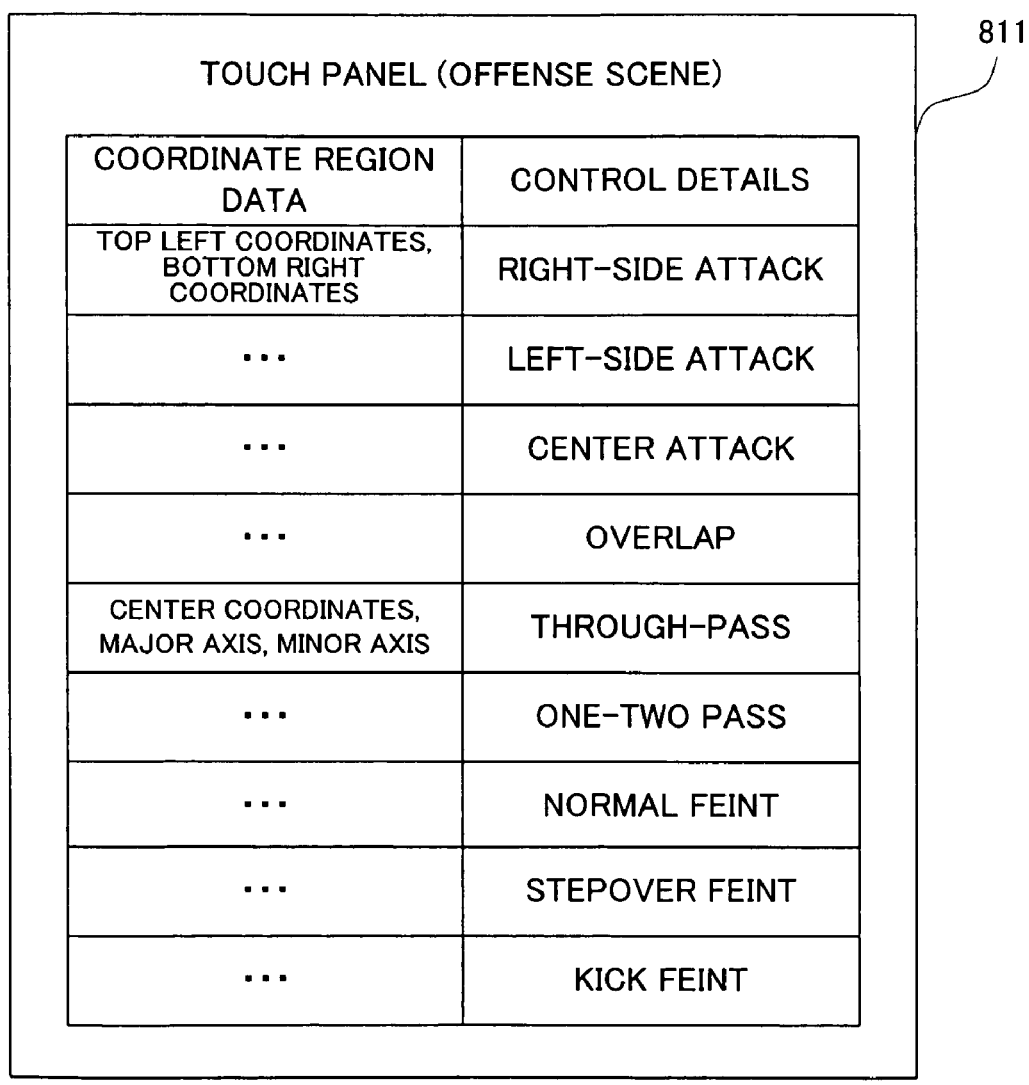
FIG. 25 shows an exemplary operation control table 811 for offense scene.

FIG. 25 shows an exemplary operation control table 811 for an offensive scene. The operation control table 811 is associated with the touch panel image shown in FIG. 4 (the image displayed on the second LCD 12). The operation control table 811 shows the correspondence between each region of the touch panel 16 (that corresponds to a button) and a control detail. The control detail is determined based on both contact point coordinate data outputted from the touch panel 16 and the operation control table 811. Button switch images for "right-side attack", "left-side attack", "center attack", and "overlap" are rectangular, and therefore for each button switch image, top left and top right coordinates on the touch panel coordinate system are memorized to make it possible to detect that a point in the rectangular region is touched. Also, button switch images for "through-pass", "one-two pass", "normal feint", "stepover feint", and "kick feint" are oval, and therefore center coordinates, the major axis, and the minor axis of the touch panel coordinate system are memorized to make it possible to detect that a point in the oval region is touched.

FIG. 26 shows an exemplary operation control table 818 associated with the operation switch section 15. The operation control table 818 has stored therein a single operation control table which defines control details when the operation switch section 15 is singly operated, and a simultaneous operation or sequential operation control table which defines control details when simultaneous or sequential operations are performed. Each table shows for both offense and defense modes which operation on the operation switch section 15 is associated with which control detail. Note that in FIG. 26, "+" means simultaneous depression, and marks of operation switches shown side by side mean sequential depression. For example, "fly through-pass" is executed by depressing A button immediately after R button and B button are simultaneously depressed. Also, "far-centering" is executed by depressing A button immediately after A button is depressed once.

Figure 27:
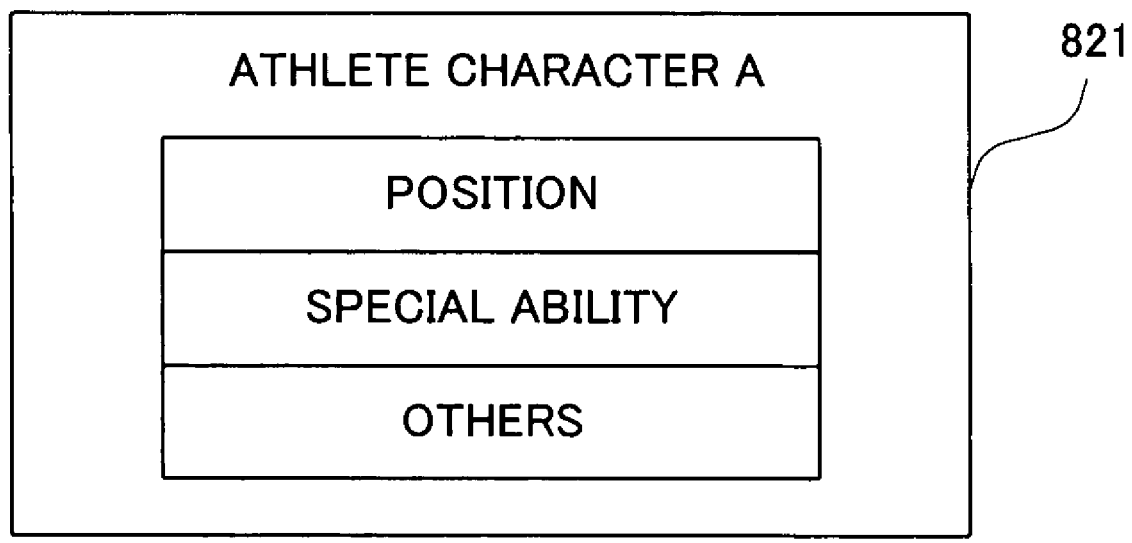
FIG. 27 shows exemplary athlete character data 821 related to athlete character A.

The athlete character data 82 is data for characterizing each athlete which appears in the game (athlete characters A, B, C, . . . ). FIG. 27 shows exemplary athlete character data 821 related to athlete character A. The athlete character data 821 includes the position of athlete character A (FW: forward, MF: midfielder, or DF: defender), special abilities, and other information (for example, name, uniform number, etc.). Examples of the special abilities include "long shoot" as shown in FIG. 7. The data shown in FIG. 27 is stored for each of the athlete characters A, B, C, . . . .

As shown in FIG. 23, examples of the image data 83 stored in the ROM 180 include a character image 831, which is image data for each athlete character, a ball image 832, which is an image of a ball, a background image 833, and a touch panel image 834. The touch panel image 834 includes a plurality of touch panel images 834a-834h associated with game situations and character attribute values. For example, the touch panel image 834g for defensive scene is an image as shown in FIG. 20. Note that the number of images included in the touch panel image 834h for special ability attack corresponds to the number of characters having a special ability. Note that, although a plurality of touch panel images are previously provided in accordance with the number of game situations, the present invention is not limited to this. For example, a touch panel image may be suitably generated by arranging a combination of button switch images, which are required in accordance with a game situation, based on the operation control table shown in FIG. 25.

In FIG. 24, the game program data 84 includes a plurality of programs used for executing the game.

An operation switch section input detection program 840 is for use in detecting an input from the operation switch section 15. A touch panel input detection program 841 is for use in detecting an input from the touch panel 16. A selected character action control program 842 is for use in controlling the action of the selected character 50. A non-selected character action control program 843 is for use in automatically controlling actions of the player's team characters other than the selected character 50. An opposing team character action control program 844 is for use in automatically controlling actions of characters in the opposing team. A ball movement control program 845 is for use in controlling the movement of the ball 51.

A soccer game progression control program 846 is for use in carrying out processes associated with the progression of the soccer game, e.g., processes concerning the start and stop of the soccer game, fouls, free kicks, etc. A soccer game image display program 847 is for use in displaying a game field (including athlete characters, etc.) on the first LCD 11. A touch panel image selection program 848 is for use in selecting a touch panel image from the aforementioned touch panel images 834a-834h in accordance with the game situation. A touch panel image display program 849 is for use in displaying the selected touch panel image on the second LCD 12.

Figure 28:
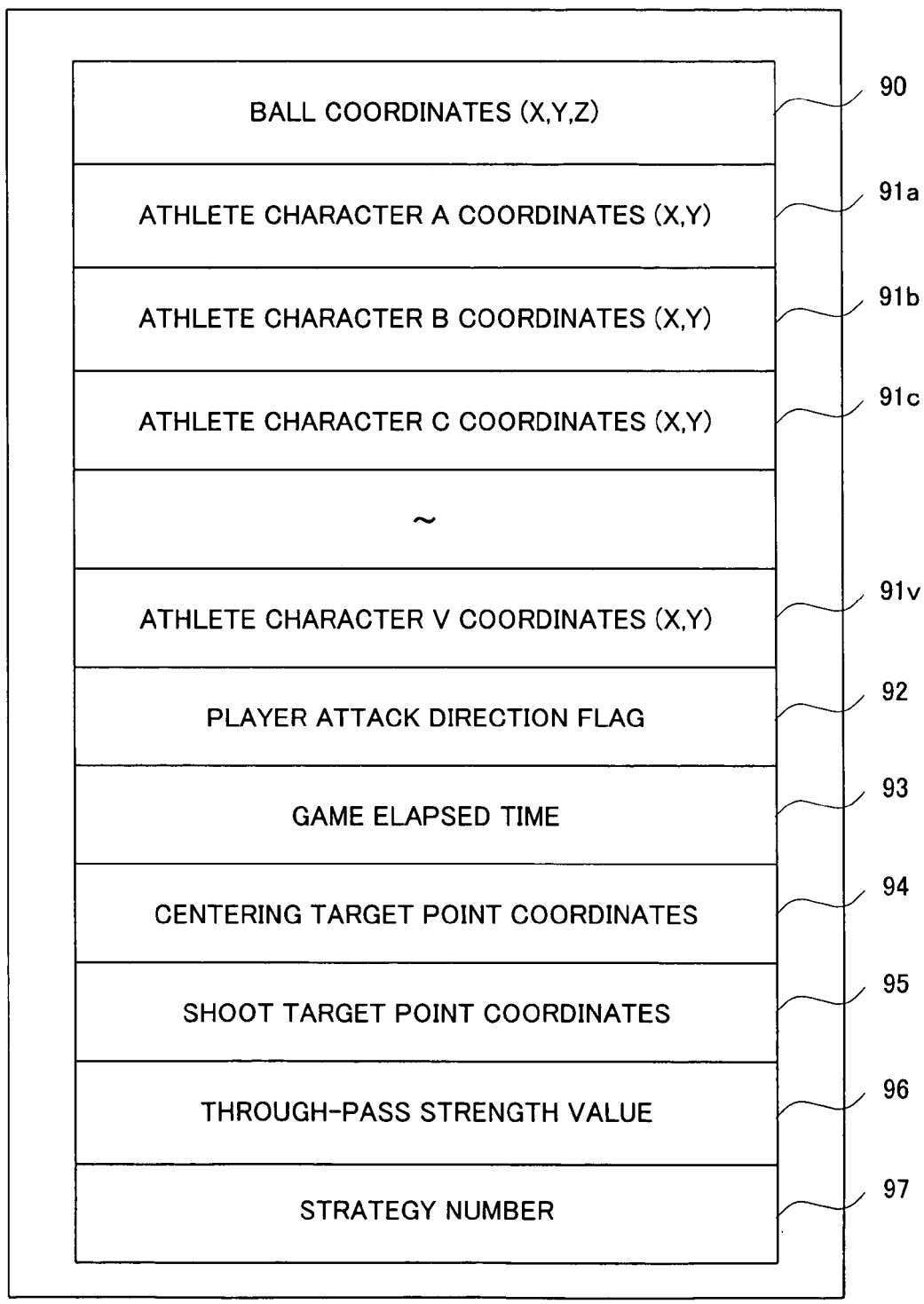
FIG. 28 is a memory map of a RAM 37.

FIG. 28 is a memory map of the RAM 37 of the hand-held game apparatus 10. Various programs as described above and data are loaded onto the RAM 37. Also, the RAM 37 temporarily stores data as shown in FIG. 28. The data is generated while the CPU core 31 is executing a game process.

Ball coordinates 90 is coordinate data which indicates the current position of the ball in the game field. Athlete character A coordinates 91a through athlete character V coordinates 91v are coordinate data which indicate the current positions of athlete characters A through V in the game field. As indicated above, a game field coordinate value is a set of three-dimensional coordinates, while each athlete character coordinate value is a set of two-dimensional coordinates. The reason why the athlete character coordinate value is represented by a set of two-dimensional coordinates is to simplify a game process, and the reason why only the ball coordinate value is represented by a set of three-dimensional coordinates is to control a ball in the air. Note that the athlete character coordinate value may be a set of three-dimensional coordinates.

A player attack direction flag 92 is data which indicates the attack direction of the player's team (for example, the direction indicated by the arrow in FIG. 8). A game elapsed time 93 is data which indicates the time elapsed from the start of the game up to the current time. Centering target point coordinates 94 is coordinate data which indicates a centering target point in the game field. Shoot target point coordinates 95 is coordinate data which indicates a shoot target point in the game field. A through-pass strength value 96 is data which indicates the strength of a through-pass which is determined as shown in FIG. 6. A strategy number 97 is an identification number which indicates a strategy currently taken by the player's team (for example, "right-side attack" is assigned with "1").

Next, flows of exemplary illustrative processes performed by CPU core 31 based on the aforementioned programs are described with reference to flowcharts in FIGS. 29-31.

Figure 29:
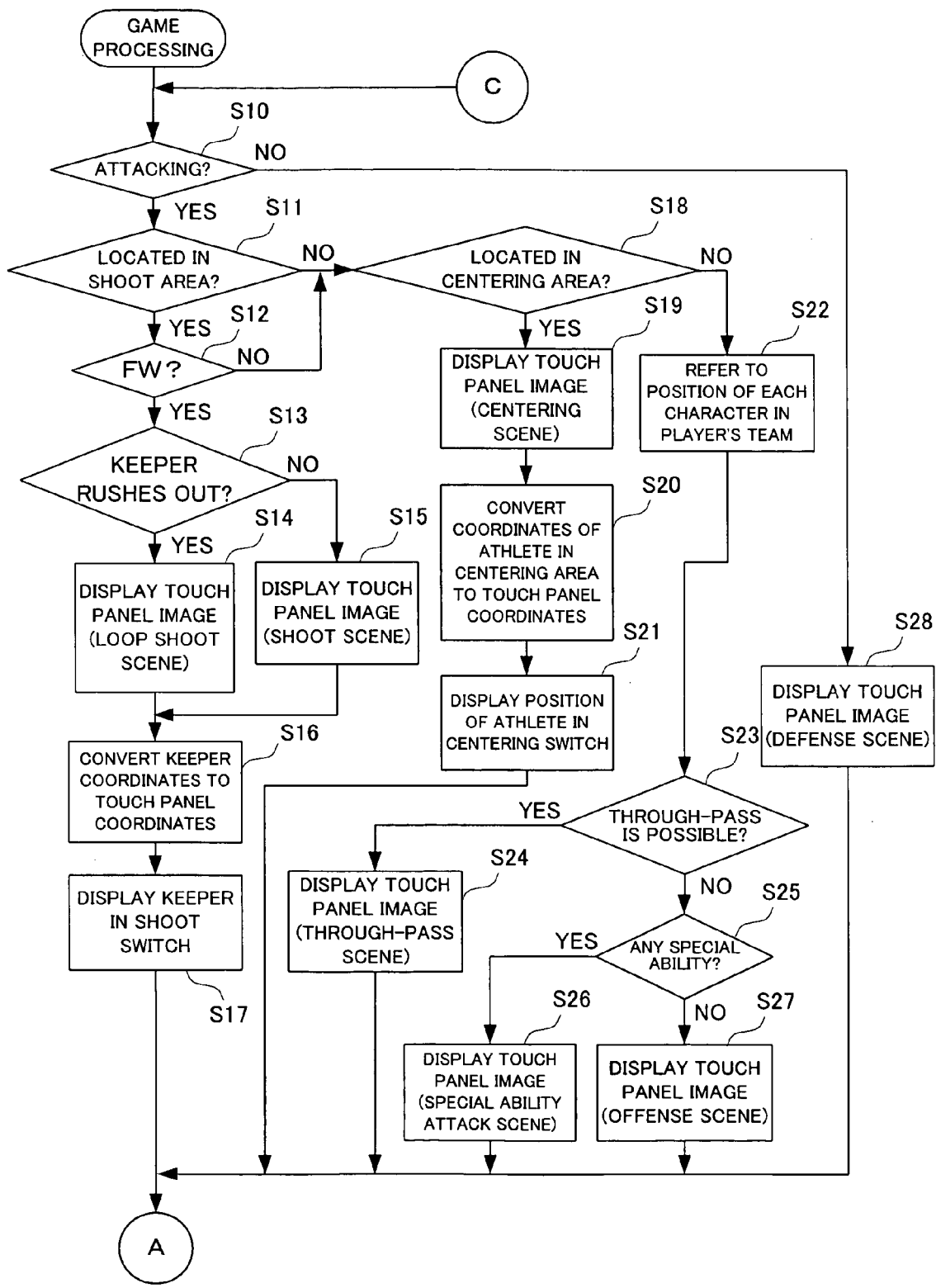
FIG. 29 is a part of a flowchart showing the flow of a process performed by a CPU CORE 31.

In FIG. 29, when the game process starts, various initialization settings are made, and thereafter a soccer game starts. The CPU core 31 determines whether the player's team is attacking (S10). If the team is attacking, the control proceeds to step S11, and if it is defending, the control proceeds to step S28.

At step S11, the CPU core 31 determines whether the selected character 50 keeping the ball 51 is located in the shoot area. If the selected character 50 is in the shoot area, whether the position of the selected character 50 is a forward (FW) is determined. If it is a forward, the control proceeds to step S13. If the case where the selected character 50 is located outside the shoot area or if the selected character 50 is in the shoot area but the position thereof is not a FW, the control proceeds to step S18.

At step S13, the CPU core 31 determines whether the keeper 65 rushes out (i.e., the keeper is located outside the goal area). If the keeper 65 is located outside the goal area, the touch panel image 834e for a loop shot scene is displayed on the second LCD 12 at step S14 (FIG. 19), and the control proceeds to step S16. On the other hand, if the keeper 65 is in the goal area, the touch panel image 834d for a shot scene is displayed on the second LCD 12 at step S15 (FIG. 15), and the control proceeds to step S16. Note that at steps S14 and S15, the image of the keeper 65 is not displayed in the button switch image 66 associated with a shot.

At step S16, the CPU core 31 converts the coordinate data of the keeper 65 in the game field to touch panel coordinates (FIG. 16). Then, the image of the keeper 65 is displayed at a position obtained by the coordinate conversion (S17). As a result, an image as shown in FIG. 15 is displayed on the second LCD 12.

At step S18, the CPU core 31 determines whether the selected character 50 keeping the ball 51 is located in the centering area.

If the selected character 50 is located in the centering area, the CPU core 31 displays the touch panel image 834c for a centering scene on the second LCD 12 (S19), and converts coordinate data of athletes present in the centering area in the game field to touch panel coordinates (S20 in FIG. 10), and a corresponding mark is displayed at the position of each athlete that has been obtained by the coordinate conversion (S21). As a result, an image as shown in FIG. 9 is displayed on the second LCD 12.

If the selected character 50 is located outside the centering area, the CPU core 31 refers to the current position of each athlete in the player's team (S22), and determines whether a through-pass is possible based on positional relationships between the athletes (S23). If the situation is one where a through-pass can be made, the touch panel image 834b for a through-pass scene is displayed on the second LCD 12 (S24 in FIG. 5). On the other hand, if the situation is one where a through-pass cannot be made, whether the selected character 50 has any special ability is determined (S25). If the character has a specialability, the touch panel image 834h for a special ability attack associated with the selected character 50 is displayed on the second LCD 12 (S26 in FIG. 7). If it does not have any special ability, the touch panel image 834a for a normal attack scene is displayed on the second LCD 12 (S27 in FIG. 4).

If the player's team is defending, the CPU core 31 displays the touch panel image 834g for a defense scene on the second LCD 12 at step S28 (FIG. 20).

Figure 30:
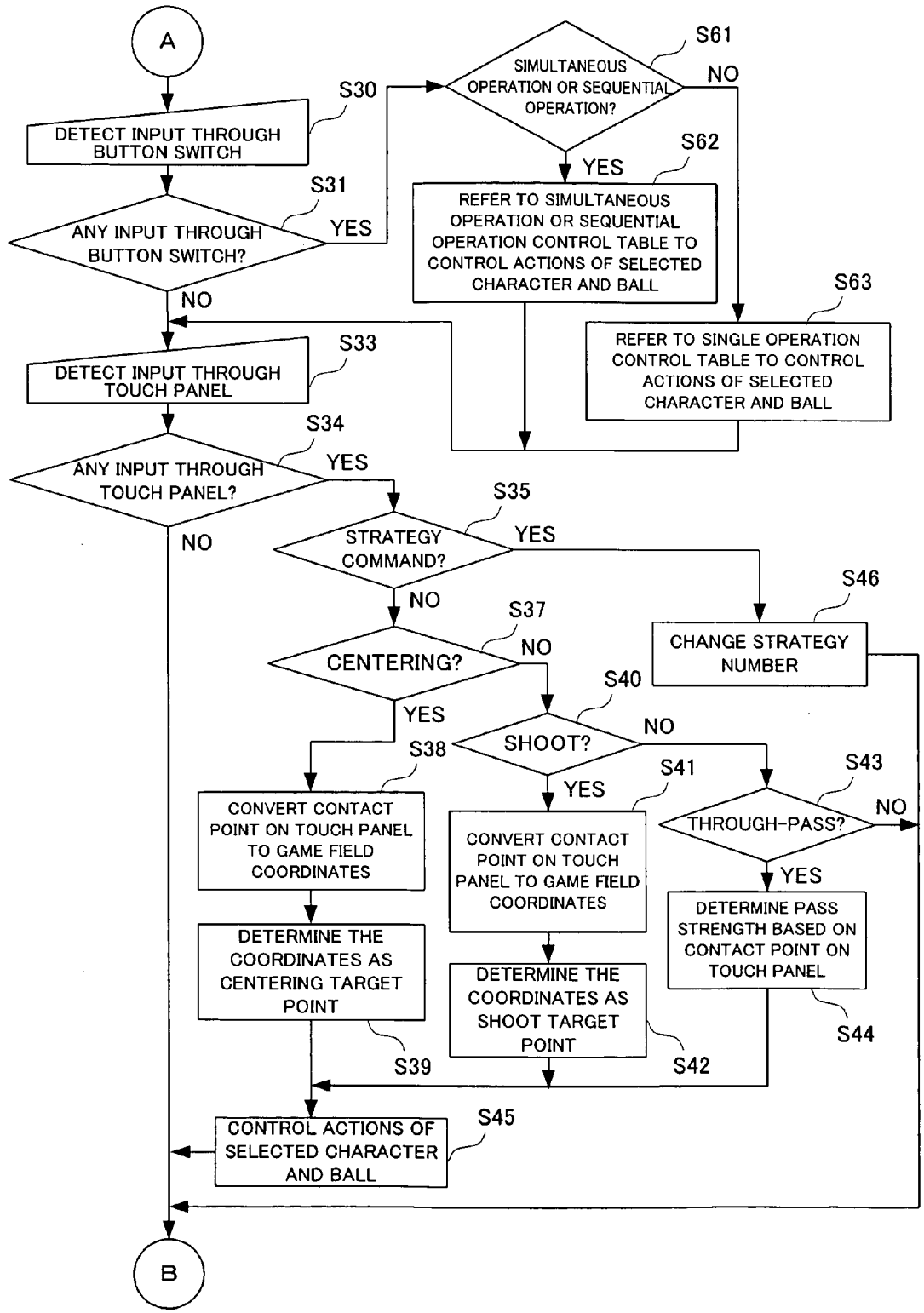
FIG. 30 is another part of the flowchart showing the flow of the process performed by the CPU CORE 31.

In FIG. 30, the CPU core 31 attempts to detect an input from the operation switch section 15 (S30), and determines whether there is any input from the operation switch section 15 (S31). If there is an input from the operation switch section 15, the control proceeds to step S61 which determines whether the input was given by a simultaneous operation or a sequential operation. Note that in the case of the sequential operation, input data from the operation switch section 15 is stored for a predetermined time period, and the determination is made based on that input data. In the case of the simultaneous operation or the sequential operation, the control proceeds to step S62. At step S62, the simultaneous operation or sequential operation control table is referenced to control actions of the selected character 50 and the ball 51, and the control proceeds to step S33. Also, in the case of neither the simultaneous operation nor the sequential operation, the control proceeds to step S63. At step S63, the single operation control table is referenced to control actions of the selected character 50 and the ball 51, and the control proceeds to step S33. In the case where there is no input from the operation switch section 15, the control proceeds to step S33.

At step S33, the CPU core 31 attempts to detect an input from the touch panel 16, and determines whether there is any input from the touch panel 16 (S34). If there is an input from the touch panel 16, the control proceeds to step S35. If there is no input from the touch panel 16, the control proceeds to step S50 in FIG. 31.

At step S35, the CPU core 31 determines whether the input from the touch panel 16 is a strategy command (an instruction associated with a rectangular button switch image). As described above, the determination is possible by collating the coordinate data from the touch panel 16 with one of the operation control tables 811-817 that is currently selected.

Figure 31:
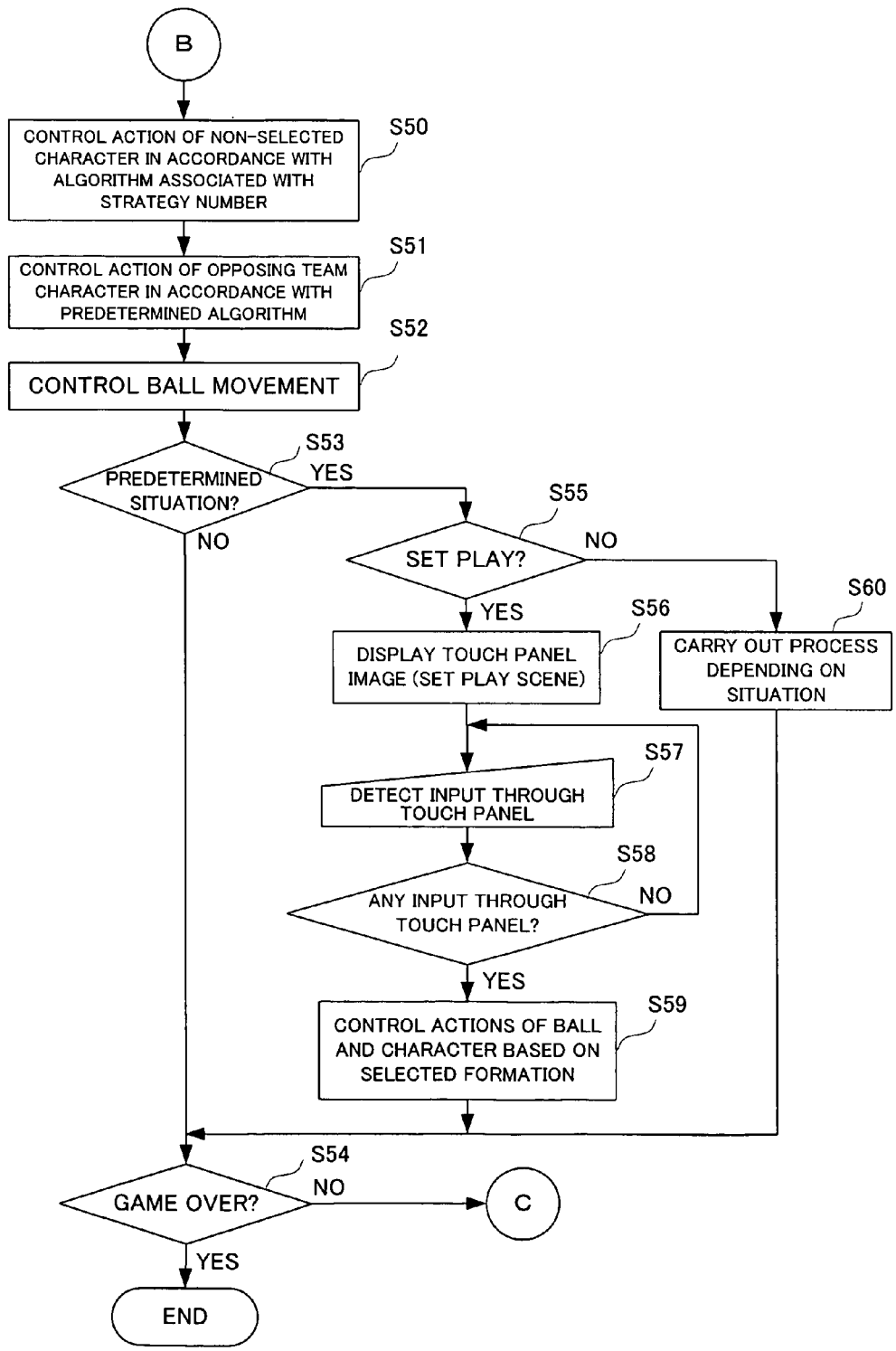
FIG. 31 is still another part of the flowchart showing the flow of the process performed by the CPU CORE 31.

In the case where the input from the touch panel 16 is a strategy command, the strategy number 97 which is previously stored in the RAM 37 is updated (S46), and the control proceeds to step S50 in FIG. 31.

On the other hand, in the case where the input from the touch panel 16 is not a strategy command, the selected character 50 is controlled so as to act in accordance with the input from the touch panel 16. Specifically, whether the input from the touch panel 16 is associated with "centering" (i.e., the button switch image 61 which indicates the centering is touched), whether it is associated with "shoot" (i.e., the button switch image 66 which indicates the shot is touched), and whether it is associated with "through-pass" (i.e., the button switch image 56 which indicates the through-pass is touched) are sequentially determined (S37, S40, and S43). In the case of "centering", coordinate data of a contact point where the stick 17 or a finger has touched the touch panel 16 is converted to game field coordinates (S38), coordinate data (a Y-coordinate is 0) obtained by the conversion is stored into the RAM 37 as the centering target point coordinates 94, and the control proceeds to step S45. Alternatively, in the case of "shoot", the coordinate data of a contact point where the stick 17 or a finger has touched the touch panel 16 is converted to game field coordinates (S41), coordinate data (an X-coordinate is Xe) obtained by the conversion is stored into the RAM 37 as the shoot target point coordinates 95, and the control proceeds to step S45. Alternatively still, in the case of "through-pass", the strength of a through-pass is determined based on coordinate data (an X-coordinate) of a contact point where the stick 17 or a finger has touched the touch panel 16 is converted to game field coordinates (S44), and the control proceeds to step S45. Note that in the case where the input from the touch panel 16 is not associated with "centering", "shoot", or "through-pass", the control proceeds to step S45 without performing any process. At step S45, the action of centering, shoot, or through-pass is implemented based on data set at step S39, S42, or S44 (i.e., the actions of an athlete character and the ball are implemented). Alternatively, in the case where the input from the touch panel 16 is given by touching a button switch image (a feint action, a one-two pass action, a pressing action, etc.) other than the centering, shoot, and through-pass actions, a corresponding action is implemented. Note that in the case where the stick 17 or a finger touches a portion on the touch panel 16 that is not associated with any action, no action is implemented at step S45, and thereafter the control proceeds to step S50 in FIG. 31.

In FIG. 31, the CPU core 31 automatically controls actions of non-selected characters in the player's team in accordance with an algorithm associated with the strategy number 97 stored in the RAM 37 (S50), and further automatically controls characters in the opposing team in accordance with a predetermined algorithm (S51). Also, the CPU core 31 carries out movement control of the ball 51 (S52).

Next, at step S53, the CPU core 31 determines whether the current game situation is a predetermined situation (throw-in, corner kick, free kick, goal kick, etc.). If it is determined to be a predetermined situation, the control proceeds to step S55. If it is not determined to be a predetermined situation, the control proceeds to step S54.

At step S55, the CPU core 31 determines whether the current game situation is a situation where a set play should be carried out (corner kick, free kick, etc.), if it is determined to be a situation where a set play should not be carried out, a process is carried out in accordance with the current situation at step S60 before the control proceeds to step S54. On the other hand, in the case where the current game situation is one where a set play should be carried out, the touch panel image 834f for a set play in accordance with the current situation is displayed on the second LCD 12 (S56), and the CPU core 31 waits for an input from the touch panel 16 (S57 and S58). Thereafter, if there is an input from the touch panel 16, the CPU core 31 controls actions of the ball 51 and each character based on the formation selected by the player (S59), and the control proceeds to step S54.

At step S54, the CPU core 31 determines whether the soccer match is over. If the match is not over, the control proceeds to step S10 in FIG. 29. If the match is over, the game processing is terminated.

Figure 32:
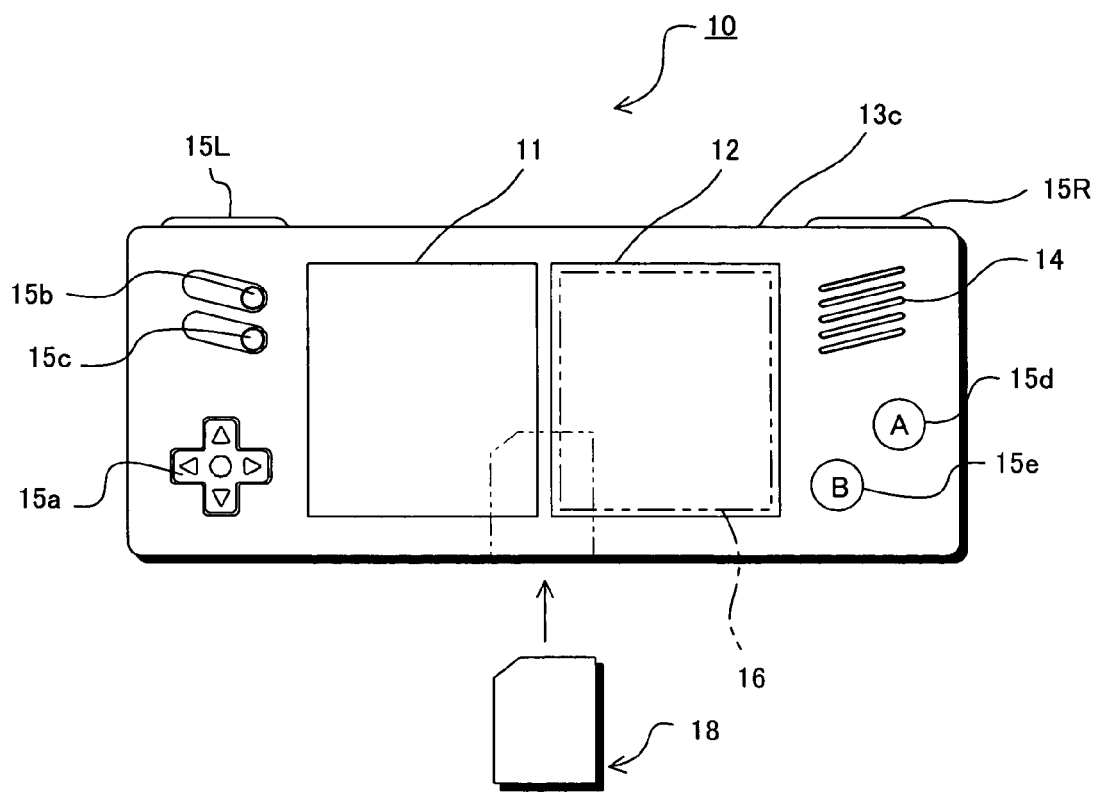
FIG. 32 shows a variation of the hand-held game apparatus shown in FIG. 1.

The above illustrates examples where two physically separate LCDs 11 and 12 are disposed one on top of the other (i.e., two vertically-arranged screens) as liquid crystal display sections embodying two screens. However, as shown in FIG. 32, a housing 13c without the upper housing 13a may be provided so as to be horizontally wider, such that the LCDs 11 and 12 embodying two screens can be disposed side by side. In this case, for the reason that most users are right-handed, the LCD 12 mounted on the touch panel 16 is disposed on the right side, and the LCD 11 is disposed on the left side. However, the positional relationship therebetween can be reversed for a hand-held game apparatus designed for left-handed users.

Also, the LCD 11 disposed on the upper side displays a game image, while the LCD 12 disposed on the lower side displays a touch panel image. However, this configuration can be reversed such that the LCD 11 disposed on the upper side displays a touch panel image, and the LCD 12 disposed on the lower side displays a game image.

Figure 33:
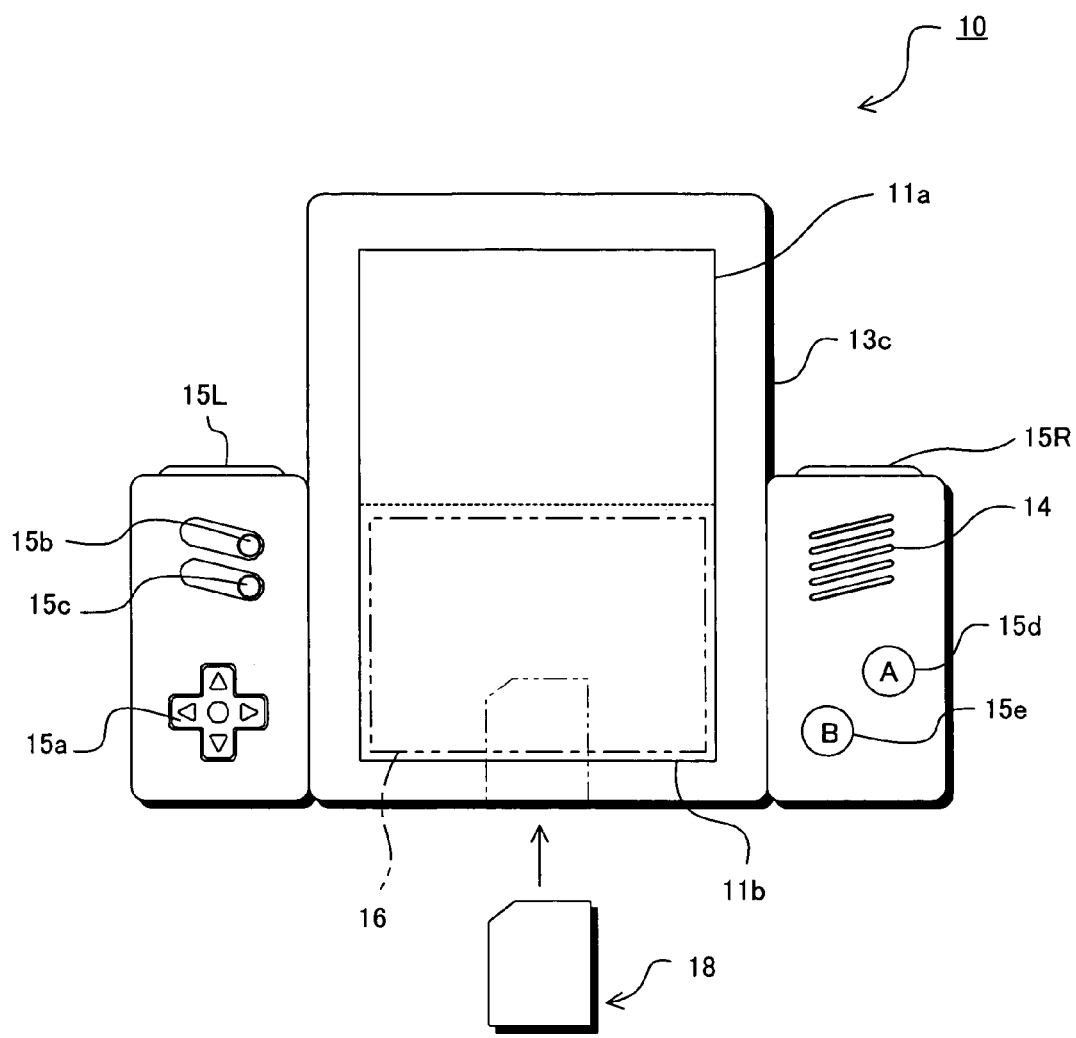
FIG. 33 shows another variation of the hand-held game apparatus shown in FIG. 1.
Figure 34:
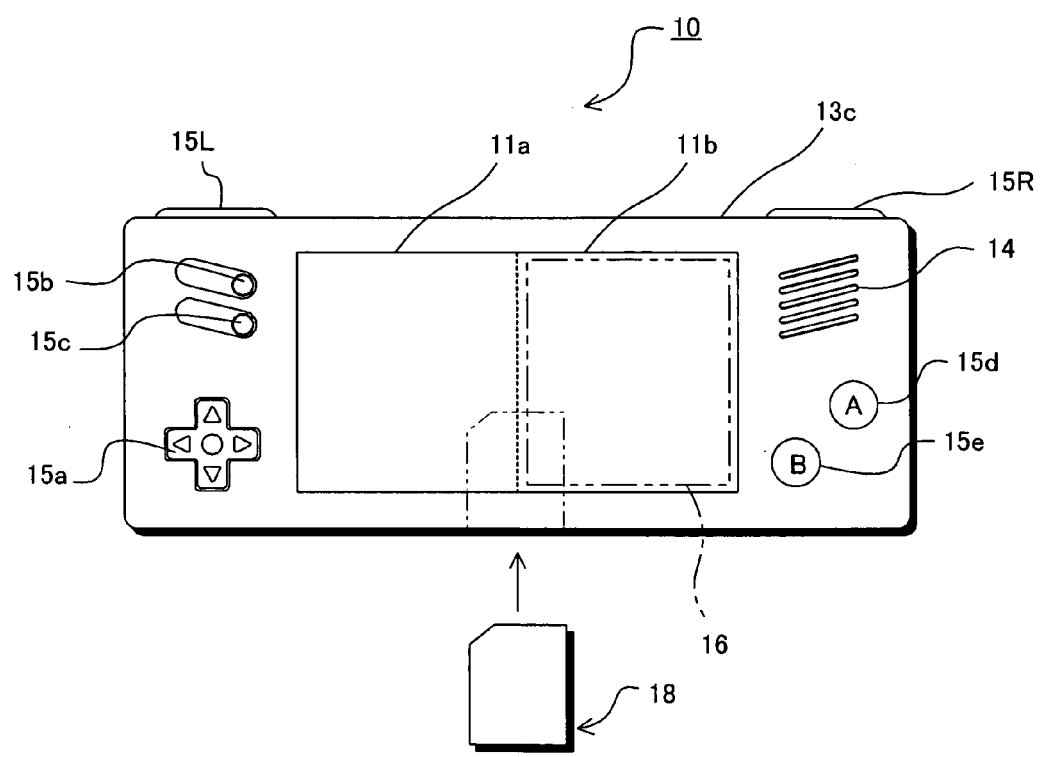
FIG. 34 shows still another variation of the hand-held game apparatus shown in FIG. 1.

In another exemplary arrangement, as shown in FIG. 33, the LCD 11, which is physically one device, is divided into upper and lower sections 11a and 11b, such that the upper section 11a displays a game image and the lower section 11b displays a touch panel image, instead of employing the two physically separate and vertically-arranged LCDs 11 and 12. In this case, the touch panel 16 may be disposed in a portion corresponding to the lower section 11b of the LCD 11, or on the entire portion of the LCD 11. Also, as shown in FIG. 34, the LCD 11, which is physically one device, may be divided into left and right sections 11a and 11b, such that the left section 11a displays a game image and the right section 11b displays a touch panel image (or vice versa). That is, in the examples of FIGS. 33 and 34, a single screen is divided into two sections which are used to display a plurality of game images.

While the invention has been described in detail, the foregoing description is in all aspects illustrative and not restrictive. It is understood that numerous other modifications and variations can be devised without departing from the scope of the invention.

What is claimed is:

1. A game apparatus for executing a game which allows a first player to control an action of a first game object and which allows a second player or a computer to control an action of a second game object, the game apparatus comprising:

a game image display;

a touch panel display provided with a touch panel;

a plurality of button switches;

second object action execution programmed logic circuitry that executes the action of the second game object regardless of whether the first game object is active;

first action execution programmed logic circuitry that detects that a button switch is singly operated and executing a first action of the first game object in accordance with a detection result;

second action execution programmed logic circuitry that detects whether button switches are simultaneously or sequentially operated or whether a button switch is repeatedly operated, and executes a second action of the first game object that is different from the first action in accordance with a detection result;

game progression control programmed logic circuitry that allows the game to progress in accordance with results of execution of the second object action execution programmed logic circuitry, the first action execution programmed logic circuitry, and the second action execution programmed logic circuitry, and displays a game situation on the game image display;

touch panel display control programmed logic circuitry that displays a touch panel image including at least one button switch image on the touch panel display;

association programmed logic circuitry that associates the second action with the button switch image; and alternate second action execution programmed logic circuitry that, when the touch panel detects a contact with the button switch image displayed on the touch panel display instead of simultaneous and/or sequential operation of the button switches, executes the second action associated with the button switch image by the association programmed logic circuitry as if the second action execution programmed logic circuitry had detected that button switches were simultaneously or sequentially operated or that the button switch was repeatedly operated.

2. The game apparatus according to claim 1, wherein a number of types of action of the first game object is greater than a number of button switches.

3. The game apparatus according to claim 1, wherein the touch panel display control programmed logic circuitry displays on the touch panel display a touch panel image including a combination of button switch images which varies depending on the game situation.

4. The game apparatus according to claim 1, wherein the touch panel display control programmed logic circuitry displays on the touch panel display a touch panel image including a button switch image which varies depending on an attribute value of the first game object.

5. The game apparatus according to claim 1, wherein
a first one of the button switch images includes a second button switch image different from the first button switch image, and
the association programmed logic circuitry associates the first button switch image with a predetermined action, and associates the second button switch image with an action which is a subdivision within a category of the predetermined action.

6. The game apparatus according to claim 1, wherein the button switch image includes an animated image which displays a second action associated with the button switch image.

7. The game apparatus according to claim 1, wherein the association programmed logic circuitry assigns a part of the second action to a button switch image included in one of the touch panel images, and assigns none of other parts of the second action.

8. The game apparatus according to claim 1, wherein
the game is a team sport game using a ball, and
the touch panel display control programmed logic circuitry displays on the touch panel display a touch panel image including a button switch image which varies depending on whether the first game object's team or the second game object's team possesses the ball.

9. The game apparatus according to claim 1, wherein
the game is a team sport game using a ball, and
the touch panel display control programmed logic circuitry displays on the touch panel display a touch panel image including a button switch image which varies depending on an area in which the ball lies.

10. The game apparatus according to claim 1, wherein the touch panel display and the plurality of button switches are co-located in a common housing.

11. A computer-readable storage medium having stored therein a game program which causes a computer of a game apparatus to execute a game which allows a first player to control an action of a first game object and which allows a second player or a computer to control an action of a second game object, the game apparatus comprising a game image display, a touch panel display provided with a touch panel, and a plurality of button switches,
wherein the game program causes the computer to act as:
second object action execution programmed logic circuitry that executes the action of the second game object regardless of whether the first game object is active;
first action execution programmed logic circuitry that detects that a button switch is singly operated and executes a first action of the first game object in accordance with a detection result;
second action execution programmed logic circuitry that detects whether button switches are simultaneously or sequentially operated or whether a button switch is repeatedly operated, and executes a second action of the first game object that is different from the first action in accordance with a detection result;
game progression control programmed logic circuitry that allows the game to progress in accordance with results of execution of the second object action execution programmed logic circuitry, the first action execution programmed logic circuitry, and the second action execution programmed logic circuitry, and displays a game situation on the game image display;
touch panel display control programmed logic circuitry that displays a touch panel image including at least one button switch image on the touch panel display;
association programmed logic circuitry that associates the second action with the button switch image; and
alternate second action execution programmed logic circuitry that, when the touch panel detects a contact with the button switch image displayed on the touch panel display instead of simultaneous and/or sequential operation of the button switches, executes the second action associated with the button switch image by the association programmed logic circuitry as if the second action execution programmed logic circuitry had detected that button switches were simultaneously or sequentially operated or that button switch was repeatedly operated.

12. The storage medium according to claim 11, wherein a number of types of action of the first game object is greater than a number of button switches.

13. The storage medium according to claim 11, wherein the touch panel display control programmed logic circuitry displays on the touch panel display a touch panel image including a combination of button switch images which varies depending on the game situation.

14. The storage medium according to claim 11, wherein the touch panel display control displays on the touch panel display a touch panel image including a button switch image which varies depending on an attribute value of the first game object.

15. The storage medium according to claim 11, wherein
a first one of the button switch images includes a second button switch image different from the first button switch image, and
the association programmed logic circuitry associates the first button switch image with a predetermined action, and associates the second button switch image with an action which is a subdivision within a category of the predetermined action.

16. The storage medium according to claim 11, wherein the button switch image includes an animated image which displays a second action associated with the button switch image.

17. The storage medium according to claim 11, wherein the association programmed logic circuitry assigns a part of the second action to a button switch image included in one of the touch panel images, and assigns none of other parts of the second action.

18. The storage medium according to claim 11, wherein
the game is a team sport game using a ball, and
the touch panel display control programmed logic circuitry displays on the touch panel display a touch panel image including a button switch image which varies depending on whether the first game object's team or the second game object's team possesses the ball.

19. The storage medium according to claim 11, wherein
the game is a team sport game using a ball, and
the touch panel display control programmed logic circuitry displays on the touch panel display a touch panel image including a button switch image which varies depending on an area in which the ball lies.

20. The storage medium according to claim 11, wherein the touch panel display and the plurality of button switches are co-located in a common housing of the game apparatus.

21. A method of controlling a game object, displayed on a game apparatus provided with at least a touch screen and a plurality of button switches, comprising:
 (a) displaying at least a first digital button on the touch screen;
 (b) associating a game object control command with said first displayed digital button, wherein said game control command corresponds to a command instructable by pressing the plurality of button switches simultaneously, the command instructable by pressing the plurality of button switches simultaneously being different than a command instructed by pressing either of button switches individually;
 (c) detecting contact with the first displayed digital button; and
 (d) causing a game object to act in accordance with the control command associated with the first displayed digital button when contact is detected with the first displayed digital button instead of simultaneous pressing of the plurality of button switches.

22. The method of claim 21, further comprising:
 (e) varying, based on an attribute of a game object, the type of the first displayed digital button.

23. The method of claim 21, further comprising:
 (e) varying, based on an attribute of a game object, the size of the first displayed digital button.

24. The method of claim 21, wherein the touch screen and the plurality of button switches are co-located in a common housing of the game apparatus.

25. A method of controlling a game object, displayed on a game apparatus provided with at least a display, a touch screen and a plurality of button switches, comprising:
 (a) displaying at least one digital button, wherein the digital button display includes an animation, and wherein the coordinates within the displayed digital button correspond to game coordinates of a game displayed on the display;
 (b) associating a game object control command with said at least one displayed digital button and also with simultaneous and/or sequential operation of the button switches,
 (c) detecting contact with the displayed digital button;
 (d) determining the coordinates, within the displayed digital button, where said contact occurred; and
 (e) causing a game object to act in accordance with the control command associated with the displayed digital button when contact is detected instead of the simultaneous and/or sequential operation of the button switches, wherein the result of the game object's action is at least partially determined by the determined coordinates so that first determined coordinates within the displayed digital button results in a first action by the game object and second determined coordinates within the displayed digital button results in a second action by the game object, the first determined coordinates within the displayed digital button being different than the second determined coordinates within the displayed digital button and the first action being different than the second action.

26. The method of claim 25, wherein the touch screen and the plurality of button switches are co-located in a common housing of the game apparatus.

* * * * *